(12) United States Patent
Coe-Sullivan et al.

(10) Patent No.: US 10,627,561 B2
(45) Date of Patent: *Apr. 21, 2020

(54) LIGHTING SYSTEMS AND DEVICES INCLUDING SAME

(71) Applicant: SAMSUNG ELECTRONICS CO., LTD., Suwon-si (KR)

(72) Inventors: Seth Coe-Sullivan, Redondo Beach, CA (US); John R. Linton, Concord, MA (US); Daniel Cohen, Concord, MA (US); John E. Ritter, Westford, MA (US)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/516,688

(22) Filed: Jul. 19, 2019

(65) Prior Publication Data

US 2019/0339435 A1    Nov. 7, 2019

Related U.S. Application Data

(63) Continuation of application No. 15/948,755, filed on Apr. 9, 2018, now Pat. No. 10,359,555, which is a
(Continued)

(51) Int. Cl.
  *G02F 1/13357*  (2006.01)
  *F21V 8/00*  (2006.01)

(52) U.S. Cl.
  CPC .......... *G02B 6/0026* (2013.01); *G02B 6/005* (2013.01); *G02B 6/0073* (2013.01)

(58) Field of Classification Search
  USPC .......................................................... 349/62
  See application file for complete search history.

(56) References Cited

U.S. PATENT DOCUMENTS 4,035,686 A   7/1977  Fleming
4,130,343 A   12/1978 Miller et al.
(Continued)

FOREIGN PATENT DOCUMENTS

JP   1260707   10/1989
JP   4238304   8/1992
(Continued)

OTHER PUBLICATIONS

Non-Final Office Action dated May 8, 2017; U.S. Appl. No. 14/886,867, filed Oct. 19, 2015 (36 pages).
(Continued)

*Primary Examiner* — Eric Wong
(74) *Attorney, Agent, or Firm* — Cantor Colburn LLP

(57) ABSTRACT

A lighting system is disclosed. The lighting system comprises at least one light source comprising a light emitting diode (LED) and one or more phosphors optically coupled to the LED to convert at least a portion of original light emitted by the LED to provide a modified LED light having a first predetermined spectral output, and an optical material that is optically coupled to at least a portion of a surface of a light guide plate and optically coupled to receive at least a portion of the modified LED light and to convert at least a portion of the modified LED light to at least one predetermined wavelength to provide modified light having a second predetermined spectral output, wherein the optical material comprises one or more types of quantum confined semiconductor nanoparticle. A device including a lighting system is also disclosed.

17 Claims, 4 Drawing Sheets

1) Light source
2) Light Guide Plate (LGP)
3) Layer comprising quantum confined semiconductor nanoparticles

Related U.S. Application Data continuation of application No. 14/960,633, filed on Dec. 7, 2015, now Pat. No. 9,946,004, which is a continuation of application No. 12/944,681, filed on Nov. 11, 2010, now Pat. No. 9,207,385, which is a continuation-in-part of application No. 12/940,343, filed on Nov. 5, 2010, now Pat. No. 9,140,844, which is a continuation of application No. PCT/US2009/002796, filed on May 6, 2009.

(60) Provisional application No. 61/260,311, filed on Nov. 11, 2009, provisional application No. 61/050,929, filed on May 6, 2008.

(56) References Cited

U.S. PATENT DOCUMENTS

| | | | |
|---|---|---|---|
| 4,382,272 A | 5/1983 | Quella et al. |
| 4,608,301 A | 8/1986 | Ishizuka et al. |
| 4,652,464 A | 3/1987 | Ludlum et al. |
| 4,701,276 A | 10/1987 | Wyman |
| 4,719,386 A | 1/1988 | Toho |
| 4,738,798 A | 4/1988 | Mahler |
| 4,766,526 A | 8/1988 | Morimoto et al. |
| 4,820,016 A | 4/1989 | Cohen et al. |
| 4,929,053 A | 5/1990 | Muller-Stute et al. |
| 5,064,718 A | 11/1991 | Buscall et al. |
| 5,077,147 A | 12/1991 | Tanaka et al. |
| 5,091,115 A | 2/1992 | Nogami et al. |
| 5,132,051 A | 7/1992 | Herron |
| 5,187,765 A | 2/1993 | Muehlemann et al. |
| 5,260,957 A | 11/1993 | Hakimi et al. |
| 5,354,707 A | 10/1994 | Chapple-Sokol et al. |
| 5,422,489 A | 6/1995 | Bhargava |
| 5,434,878 A | 7/1995 | Lawandy |
| 5,442,254 A | 8/1995 | Jaskie |
| 5,455,489 A | 10/1995 | Bhargava |
| 5,504,661 A | 4/1996 | Szpak |
| 5,505,928 A | 4/1996 | Alivisatos et al. |
| 5,527,386 A | 6/1996 | Statz |
| 5,534,056 A | 7/1996 | Kuehnle et al. |
| 5,557,436 A | 9/1996 | Blose et al. |
| 5,586,879 A | 12/1996 | Szpak |
| 5,599,897 A | 2/1997 | Nishiguchi et al. |
| 5,716,679 A | 2/1998 | Krug et al. |
| 5,717,289 A | 2/1998 | Tanaka |
| 5,777,433 A | 7/1998 | Lester et al. |
| 5,813,753 A | 9/1998 | Vriens et al. |
| 5,847,507 A | 12/1998 | Butterworth et al. |
| 5,881,200 A | 3/1999 | Burt |
| 5,882,779 A | 3/1999 | Lawandy |
| 5,909,081 A | 6/1999 | Eida et al. |
| 5,917,279 A | 6/1999 | Elschner et al. |
| 5,955,528 A | 9/1999 | Sato et al. |
| 5,955,837 A | 9/1999 | Horikx et al. |
| 5,959,316 A | 9/1999 | Lowery et al. |
| 5,962,971 A | 10/1999 | Chen |
| 5,975,711 A | 11/1999 | Parker et al. |
| 5,982,092 A | 11/1999 | Chen |
| 5,988,822 A | 11/1999 | Abe et al. |
| 5,998,925 A | 12/1999 | Shimizu et al. |
| 6,005,707 A | 12/1999 | Berggren et al. |
| 6,023,371 A | 2/2000 | Onitsuka et al. |
| 6,048,616 A | 4/2000 | Gallagher et al. |
| 6,066,861 A | 5/2000 | Hohn et al. |
| 6,069,442 A | 5/2000 | Hung et al. |
| 6,114,038 A | 9/2000 | Castro et al. |
| 6,117,529 A | 9/2000 | Leising et al. |
| 6,236,493 B1 | 5/2001 | Schmidt et al. |
| 6,249,372 B1 | 6/2001 | Kobayashi et al. |
| 6,259,506 B1 | 7/2001 | Lawandy |
| 6,319,426 B1 | 11/2001 | Bawendi et al. |
| 6,322,901 B1 | 11/2001 | Bawendi et al. |
| 6,340,824 B1 | 1/2002 | Komoto et al. |
| 6,357,889 B1 | 3/2002 | Duggal et al. |
| 6,358,652 B1 | 3/2002 | Tomiuchi et al. |
| 6,422,712 B1 | 7/2002 | Nousiainen et al. |
| 6,464,898 B1 | 10/2002 | Tomoike et al. |
| 6,473,554 B1 | 10/2002 | Pelka et al. |
| 6,482,664 B1 | 11/2002 | Kanekiyo |
| 6,501,091 B1 | 12/2002 | Bawendi et al. |
| 6,548,168 B1 | 4/2003 | Mulvaney et al. |
| 6,548,834 B2 | 4/2003 | Sugawara |
| 6,565,770 B1 | 5/2003 | Mayer et al. |
| 6,576,155 B1 | 6/2003 | Barbera-Guillem |
| 6,576,291 B2 | 6/2003 | Bawendi et al. |
| 6,576,930 B2 | 6/2003 | Reeh et al. |
| 6,577,073 B2 | 6/2003 | Shimizu et al. |
| 6,586,095 B2 | 7/2003 | Wang et al. |
| 6,600,175 B1 | 7/2003 | Baretz et al. |
| 6,608,332 B2 | 8/2003 | Shimizu et al. |
| 6,608,439 B1 | 8/2003 | Sokolik et al. |
| 6,613,247 B1 | 9/2003 | Hohn et al. |
| 6,637,905 B1 | 10/2003 | Ng et al. |
| 6,637,924 B2 | 10/2003 | Pelka et al. |
| 6,639,733 B2 | 10/2003 | Minano et al. |
| 6,641,755 B2 | 11/2003 | Tomoike et al. |
| 6,642,552 B2 | 11/2003 | Stern |
| 6,650,044 B1 | 11/2003 | Lowery |
| 6,653,778 B1 | 11/2003 | Tomiuchi et al. |
| 6,677,610 B2 | 1/2004 | Choi et al. |
| 6,703,781 B2 | 3/2004 | Zovko |
| 6,710,366 B1 | 3/2004 | Lee et al. |
| 6,710,911 B2 | 3/2004 | Locascio et al. |
| 6,714,711 B1 | 3/2004 | Lieberman et al. |
| 6,731,359 B1 | 5/2004 | Fukaya |
| 6,734,465 B1 | 5/2004 | Taskar et al. |
| 6,744,077 B2 | 6/2004 | Trottier et al. |
| 6,744,960 B2 | 6/2004 | Pelka |
| 6,777,531 B2 | 8/2004 | Yasuda et al. |
| 6,777,706 B1 | 8/2004 | Tessler et al. |
| 6,781,148 B2 | 8/2004 | Kubota et al. |
| 6,784,603 B2 | 8/2004 | Pelka et al. |
| 6,791,259 B1 | 9/2004 | Stokes et al. |
| 6,794,686 B2 | 9/2004 | Chang et al. |
| 6,801,270 B2 | 10/2004 | Faris et al. |
| 6,803,719 B1 | 10/2004 | Miller et al. |
| 6,812,500 B2 | 11/2004 | Reeh et al. |
| 6,819,845 B2 | 11/2004 | Lee et al. |
| 6,821,559 B2 | 11/2004 | Eberspacher et al. |
| 6,830,835 B2 | 12/2004 | Saito et al. |
| 6,835,326 B2 | 12/2004 | Barbera-Guillem |
| 6,838,743 B2 | 1/2005 | Yamada et al. |
| 6,849,109 B2 | 2/2005 | Yadav et al. |
| 6,864,626 B1 | 3/2005 | Weiss et al. |
| 6,869,545 B2 | 3/2005 | Peng et al. |
| 6,876,796 B2 | 4/2005 | Garito et al. |
| 6,885,033 B2 | 4/2005 | Andrews |
| 6,891,330 B2 | 5/2005 | Duggal et al. |
| 6,903,505 B2 | 6/2005 | McNulty et al. |
| 6,913,830 B2 | 7/2005 | Decker et al. |
| 6,914,106 B2 | 7/2005 | Leon et al. |
| 6,924,596 B2 | 8/2005 | Sato et al. |
| 6,957,608 B1 | 10/2005 | Hubert et al. |
| 6,961,105 B2 | 11/2005 | Chang et al. |
| 7,005,667 B2 | 2/2006 | Chen et al. |
| 7,005,669 B1 | 2/2006 | Lee |
| 7,008,559 B2 | 3/2006 | Chen |
| 7,040,774 B2 | 5/2006 | Beeson et al. |
| 7,042,020 B2 | 5/2006 | Negley |
| 7,045,956 B2 | 5/2006 | Braune et al. |
| 7,046,439 B2 | 5/2006 | Kaminsky et al. |
| 7,065,285 B2 | 6/2006 | Chen et al. |
| 7,066,623 B2 | 6/2006 | Lee et al. |
| 7,068,898 B2 | 6/2006 | Buretea et al. |
| 7,070,300 B2 | 7/2006 | Harbers et al. |
| 7,071,616 B2 | 7/2006 | Shimizu et al. |
| 7,075,225 B2 | 7/2006 | Baroky et al. |
| 7,078,732 B1 | 7/2006 | Reeh et al. |
| 7,090,355 B2 | 8/2006 | Liu et al. |
| 7,091,653 B2 | 8/2006 | Ouderkirk et al. |
| 7,091,656 B2 | 8/2006 | Murazaki et al. |
| 7,102,152 B2 | 9/2006 | Chua et al. |
| 7,108,416 B1 | 9/2006 | Osawa |

(56) References Cited

U.S. PATENT DOCUMENTS

| | | |
|---|---|---|
| 7,110,299 B2 | 9/2006 | Forbes |
| 7,123,796 B2 | 10/2006 | Steckl et al. |
| 7,126,162 B2 | 10/2006 | Reeh et al. |
| 7,129,515 B2 | 10/2006 | Okuyama et al. |
| 7,135,816 B2 | 11/2006 | Kawaguchi et al. |
| 7,144,131 B2 | 12/2006 | Rains |
| 7,160,613 B2 | 1/2007 | Bawendi et al. |
| 7,166,010 B2 | 1/2007 | Lamansky et al. |
| 7,168,833 B2 | 1/2007 | Schottland et al. |
| 7,172,811 B2 | 2/2007 | Denisyuk et al. |
| 7,175,948 B2 | 2/2007 | Yoshihara et al. |
| 7,189,768 B2 | 3/2007 | Baran et al. |
| 7,196,354 B1 | 3/2007 | Erchak et al. |
| 7,199,393 B2 | 4/2007 | Park et al. |
| 7,213,940 B1 | 5/2007 | Van De Ven et al. |
| 7,226,856 B1 | 6/2007 | Lopatin et al. |
| 7,235,792 B2 | 6/2007 | Elofson |
| 7,239,080 B2 | 7/2007 | Ng et al. |
| 7,242,030 B2 | 7/2007 | Wang et al. |
| 7,245,065 B2 | 7/2007 | Ghosh et al. |
| 7,253,452 B2 | 8/2007 | Steckel et al. |
| 7,259,400 B1 | 8/2007 | Taskar |
| 7,264,527 B2 | 9/2007 | Bawendi et al. |
| 7,265,488 B2 | 9/2007 | Ng et al. |
| 7,273,309 B2 | 9/2007 | Ford et al. |
| 7,279,716 B2 | 10/2007 | Chen |
| 7,279,832 B2 | 10/2007 | Thurk et al. |
| 7,294,861 B2 | 11/2007 | Schardt et al. |
| 7,318,651 B2 | 1/2008 | Chua et al. |
| 7,321,193 B2 | 1/2008 | Antoniadis et al. |
| 7,326,365 B2 | 2/2008 | Bawendi et al. |
| 7,329,371 B2 | 2/2008 | Setlur et al. |
| 7,350,933 B2 | 4/2008 | Ng et al. |
| 7,364,925 B2 | 4/2008 | Lee et al. |
| 7,374,807 B2 | 5/2008 | Parce et al. |
| 7,390,568 B2 | 6/2008 | Kim et al. |
| 7,393,618 B2 | 7/2008 | Ioku et al. |
| 7,420,323 B2 | 9/2008 | Krummacher |
| 7,430,355 B2 | 9/2008 | Heikenfeld et al. |
| 7,459,145 B2 | 12/2008 | Bao et al. |
| 7,462,502 B2 | 12/2008 | Paolini et al. |
| 7,462,984 B2 | 12/2008 | Handa et al. |
| 7,466,885 B2 | 12/2008 | Gugel |
| 7,473,922 B2 | 1/2009 | Uchiyama et al. |
| 7,481,562 B2 | 1/2009 | Chua et al. |
| 7,488,101 B2 | 2/2009 | Brukilacchio |
| 7,495,383 B2 | 2/2009 | Chua et al. |
| 7,496,259 B2 | 2/2009 | Karasawa |
| 7,497,581 B2 | 3/2009 | Beeson et al. |
| 7,513,669 B2 | 4/2009 | Chua et al. |
| 7,522,647 B2 | 4/2009 | Hatori et al. |
| 7,534,002 B2 | 5/2009 | Yamaguchi et al. |
| 7,535,524 B2 | 5/2009 | Chua et al. |
| 7,546,013 B1 | 6/2009 | Santori et al. |
| 7,553,683 B2 | 6/2009 | Martin et al. |
| 7,554,257 B2 | 6/2009 | Krummacher et al. |
| 7,560,747 B2 | 7/2009 | Cok |
| 7,560,859 B2 | 7/2009 | Saito et al. |
| 7,592,618 B2 | 9/2009 | Khang et al. |
| 7,595,508 B2 | 9/2009 | Otsubo et al. |
| 7,614,759 B2 | 11/2009 | Negley |
| 7,645,397 B2 | 1/2010 | Parce et al. |
| 7,679,102 B2 | 3/2010 | Chik et al. |
| 7,682,850 B2 | 3/2010 | Harbers et al. |
| 7,686,493 B2 | 3/2010 | Roshan et al. |
| 7,692,373 B2 | 4/2010 | Bawendi et al. |
| 7,695,150 B2 | 4/2010 | Dejima et al. |
| 7,703,942 B2 | 4/2010 | Narendran et al. |
| 7,710,026 B2 | 5/2010 | Cok et al. |
| 7,719,016 B2 | 5/2010 | Nada et al. |
| 7,722,422 B2 | 5/2010 | Cok |
| 7,723,744 B2 | 5/2010 | Gillies et al. |
| 7,732,237 B2 | 6/2010 | Xie |
| 7,732,823 B2 | 6/2010 | Kawaguchi |
| 7,750,359 B2 | 7/2010 | Narendran et al. |
| 7,750,425 B2 | 7/2010 | Forrest et al. |
| 7,772,551 B2 | 8/2010 | Todori et al. |
| 7,791,092 B2 | 9/2010 | Tarsa et al. |
| 7,791,271 B2 | 9/2010 | Cok et al. |
| 7,795,609 B2 | 9/2010 | Huffaker et al. |
| 7,813,160 B2 | 10/2010 | Drndic et al. |
| 7,834,372 B2 | 11/2010 | Zhai et al. |
| 7,837,348 B2 | 11/2010 | Narendran et al. |
| 7,842,385 B2 | 11/2010 | Jang et al. |
| 7,847,302 B2 | 12/2010 | Basin et al. |
| 7,850,777 B2 | 12/2010 | Peng et al. |
| 7,858,408 B2 | 12/2010 | Mueller et al. |
| 7,880,377 B2 | 2/2011 | Orita et al. |
| 7,884,384 B2 | 2/2011 | Chung et al. |
| 7,898,665 B2 | 3/2011 | Brukilacchio et al. |
| 7,901,111 B2 | 3/2011 | Negley |
| 7,902,748 B2 | 3/2011 | Cok |
| 7,952,105 B2 | 5/2011 | Cok |
| 7,969,085 B2 | 6/2011 | Cok |
| 7,982,396 B2 | 7/2011 | Cok |
| 7,989,153 B2 | 8/2011 | Skipor et al. |
| 8,021,008 B2 | 9/2011 | Ramer |
| 8,033,706 B1 | 10/2011 | Kelly et al. |
| 8,044,414 B2 | 10/2011 | Hori et al. |
| 8,076,410 B2 | 12/2011 | Nayfeh et al. |
| 8,084,934 B2 | 12/2011 | Kim et al. |
| 8,128,249 B2 | 3/2012 | Skipor et al. |
| 8,174,181 B2 | 5/2012 | Bawendi et al. |
| 8,237,154 B2 | 8/2012 | Jang et al. |
| 8,288,943 B2 | 10/2012 | Ansems et al. |
| 8,343,575 B2 | 1/2013 | Dubrow |
| 8,353,613 B2 | 1/2013 | Choi et al. |
| 8,360,617 B2 | 1/2013 | Gillies et al. |
| 8,399,900 B2 | 3/2013 | Hartmann |
| 8,403,531 B2 | 3/2013 | Negley et al. |
| 8,405,063 B2 | 3/2013 | Kazlas et al. |
| 8,427,855 B2 | 4/2013 | Jang et al. |
| 8,569,949 B2 | 10/2013 | Lenk et al. |
| 8,618,561 B2 | 12/2013 | Coe-Sullivan |
| 8,642,977 B2 | 2/2014 | Comerford et al. |
| 8,684,559 B2 | 4/2014 | Van De Ven et al. |
| 8,718,437 B2 | 5/2014 | Coe-Sullivan et al. |
| 8,759,850 B2 | 6/2014 | Coe-Sullivan et al. |
| 9,096,425 B2 | 8/2015 | Coe-Sullivan et al. |
| 2001/0001207 A1 | 5/2001 | Shimizu et al. |
| 2001/0028055 A1 | 10/2001 | Fafard et al. |
| 2002/0021003 A1 | 2/2002 | Mcgrew |
| 2002/0053359 A1 | 5/2002 | Harman et al. |
| 2002/0071948 A1 | 6/2002 | Duff et al. |
| 2002/0127224 A1 | 9/2002 | Chen et al. |
| 2002/0136932 A1 | 9/2002 | Yoshida |
| 2002/0157574 A1 | 10/2002 | Weitzel et al. |
| 2002/0186921 A1 | 12/2002 | Schumacher et al. |
| 2003/0010987 A1 | 1/2003 | Banin et al. |
| 2003/0030706 A1 | 2/2003 | Jagannathan et al. |
| 2003/0044114 A1 | 3/2003 | Pelka |
| 2003/0048346 A1 | 3/2003 | Chow |
| 2003/0059635 A1 | 3/2003 | Naasani |
| 2003/0091933 A1 | 5/2003 | Kunita |
| 2003/0142944 A1 | 7/2003 | Sundar et al. |
| 2003/0151700 A1 | 8/2003 | Carter et al. |
| 2003/0156425 A1 | 8/2003 | Turnbull et al. |
| 2003/0160260 A1 | 8/2003 | Hirai et al. |
| 2003/0175004 A1 | 9/2003 | Garito et al. |
| 2003/0180029 A1 | 9/2003 | Garito et al. |
| 2003/0194578 A1 | 10/2003 | Tam et al. |
| 2003/0227249 A1 | 12/2003 | Mueller et al. |
| 2004/0007169 A1 | 1/2004 | Ohtsu et al. |
| 2004/0012083 A1 | 1/2004 | Farrell et al. |
| 2004/0023010 A1 | 2/2004 | Bulovic et al. |
| 2004/0067431 A1 | 4/2004 | Arney et al. |
| 2004/0091710 A1 | 5/2004 | Bawendi et al. |
| 2004/0110002 A1 | 6/2004 | Kim et al. |
| 2004/0131789 A1 | 7/2004 | Brown |
| 2004/0135495 A1 | 7/2004 | Wu et al. |
| 2004/0145289 A1 | 7/2004 | Ouderkirk et al. |
| 2004/0146560 A1 | 7/2004 | Whiteford et al. |
| 2004/0174715 A1 | 9/2004 | Page et al. |
| 2004/0178338 A1 | 9/2004 | Empedocles et al. |

(56) References Cited

U.S. PATENT DOCUMENTS

| | | |
|---|---|---|
| 2004/0201664 A1 | 10/2004 | Bringley et al. |
| 2004/0203170 A1 | 10/2004 | Barbera-Guillem |
| 2004/0233139 A1 | 11/2004 | Asano et al. |
| 2004/0245912 A1 | 12/2004 | Murk et al. |
| 2004/0262583 A1 | 12/2004 | Lee |
| 2005/0002635 A1 | 1/2005 | Banin et al. |
| 2005/0012076 A1 | 1/2005 | Morioka |
| 2005/0051777 A1 | 3/2005 | Hill |
| 2005/0058416 A1 | 3/2005 | Lee et al. |
| 2005/0088079 A1 | 4/2005 | Daniels |
| 2005/0093422 A1 | 5/2005 | Wang et al. |
| 2005/0098787 A1 | 5/2005 | Andrews |
| 2005/0111805 A1 | 5/2005 | Hertz et al. |
| 2005/0126628 A1 | 6/2005 | Scher et al. |
| 2005/0129947 A1 | 6/2005 | Peng et al. |
| 2005/0134723 A1 | 6/2005 | Lee et al. |
| 2005/0135079 A1 | 6/2005 | Chua et al. |
| 2005/0139852 A1 | 6/2005 | Chen et al. |
| 2005/0142343 A1 | 6/2005 | Winkler et al. |
| 2005/0157996 A1 | 7/2005 | McCarthy et al. |
| 2005/0164227 A1 | 7/2005 | Ogura et al. |
| 2005/0180680 A1 | 8/2005 | Kong |
| 2005/0185686 A1 | 8/2005 | Rupasov et al. |
| 2005/0200269 A1 | 9/2005 | Ng et al. |
| 2005/0212405 A1 | 9/2005 | Negley |
| 2005/0214967 A1 | 9/2005 | Scher et al. |
| 2005/0218377 A1 | 10/2005 | Lawandy |
| 2005/0236556 A1 | 10/2005 | Sargent et al. |
| 2005/0254258 A1 | 11/2005 | Lee |
| 2005/0258418 A1 | 11/2005 | Steckel et al. |
| 2005/0261400 A1 | 11/2005 | Yang et al. |
| 2005/0265404 A1 | 12/2005 | Ashdown |
| 2005/0266246 A1 | 12/2005 | Reiss et al. |
| 2005/0272159 A1 | 12/2005 | Ismagilov et al. |
| 2005/0275615 A1 | 12/2005 | Kahen et al. |
| 2005/0279949 A1 | 12/2005 | Oldham et al. |
| 2006/0001036 A1 | 1/2006 | Jacob et al. |
| 2006/0002101 A1 | 1/2006 | Wheatley et al. |
| 2006/0003097 A1 | 1/2006 | Andres et al. |
| 2006/0003114 A1 | 1/2006 | Enlow et al. |
| 2006/0003156 A1 | 1/2006 | Masutani et al. |
| 2006/0012853 A1 | 1/2006 | Tallone et al. |
| 2006/0024525 A1 | 2/2006 | Jeong et al. |
| 2006/0034065 A1 | 2/2006 | Thurk |
| 2006/0038182 A1 | 2/2006 | Rogers et al. |
| 2006/0040103 A1 | 2/2006 | Whiteford et al. |
| 2006/0043361 A1 | 3/2006 | Lee et al. |
| 2006/0057480 A1 | 3/2006 | Lin et al. |
| 2006/0060862 A1 | 3/2006 | Bawendi et al. |
| 2006/0063029 A1 | 3/2006 | Jang et al. |
| 2006/0063289 A1 | 3/2006 | Negley et al. |
| 2006/0066210 A1 | 3/2006 | Ng et al. |
| 2006/0067602 A1 | 3/2006 | Todori et al. |
| 2006/0068154 A1 | 3/2006 | Parce et al. |
| 2006/0069314 A1 | 3/2006 | Farr |
| 2006/0071218 A1 | 4/2006 | Takeda et al. |
| 2006/0081862 A1 | 4/2006 | Chua et al. |
| 2006/0097624 A1 | 5/2006 | Murase et al. |
| 2006/0103589 A1 | 5/2006 | Chua et al. |
| 2006/0105481 A1 | 5/2006 | Boardman et al. |
| 2006/0105483 A1 | 5/2006 | Leatherdale et al. |
| 2006/0109682 A1 | 5/2006 | Ko et al. |
| 2006/0113895 A1 | 6/2006 | Baroky et al. |
| 2006/0128845 A1 | 6/2006 | Emrick et al. |
| 2006/0145599 A1 | 7/2006 | Stegamat et al. |
| 2006/0146565 A1 | 7/2006 | Lee |
| 2006/0147703 A1 | 7/2006 | Walker et al. |
| 2006/0157686 A1 | 7/2006 | Jang et al. |
| 2006/0157720 A1 | 7/2006 | Bawendi et al. |
| 2006/0157721 A1 | 7/2006 | Tran et al. |
| 2006/0160162 A1 | 7/2006 | Fulwyler et al. |
| 2006/0169971 A1 | 8/2006 | Cho et al. |
| 2006/0196375 A1 | 9/2006 | Coe-Sullivan et al. |
| 2006/0197059 A1 | 9/2006 | Kram et al. |
| 2006/0197437 A1 | 9/2006 | Krummacher et al. |
| 2006/0199886 A1 | 9/2006 | Ryang |
| 2006/0204676 A1 | 9/2006 | Jones et al. |
| 2006/0204679 A1 | 9/2006 | Jones et al. |
| 2006/0210726 A1 | 9/2006 | Jones et al. |
| 2006/0214903 A1 | 9/2006 | Kurosaka |
| 2006/0215958 A1 | 9/2006 | Yeo et al. |
| 2006/0216508 A1 | 9/2006 | Denisyuk et al. |
| 2006/0216759 A1 | 9/2006 | Naasani et al. |
| 2006/0221021 A1 | 10/2006 | Hajjar et al. |
| 2006/0227546 A1 | 10/2006 | Yeo et al. |
| 2006/0238103 A1 | 10/2006 | Choi et al. |
| 2006/0238671 A1 | 10/2006 | Kim et al. |
| 2006/0240258 A1 | 10/2006 | Sato et al. |
| 2006/0244358 A1 | 11/2006 | Kim et al. |
| 2006/0244367 A1 | 11/2006 | Im et al. |
| 2006/0245710 A1 | 11/2006 | Borrelli et al. |
| 2006/0255713 A1 | 11/2006 | Kondo et al. |
| 2006/0268571 A1 | 11/2006 | Harada et al. |
| 2006/0274226 A1 | 12/2006 | Im et al. |
| 2006/0279296 A1 | 12/2006 | Lee et al. |
| 2006/0291252 A1 | 12/2006 | Lim et al. |
| 2007/0001581 A1 | 1/2007 | Stasiak et al. |
| 2007/0004065 A1 | 1/2007 | Schardt et al. |
| 2007/0012355 A1 | 1/2007 | LoCascio et al. |
| 2007/0012928 A1 | 1/2007 | Peng et al. |
| 2007/0012941 A1 | 1/2007 | Cheon |
| 2007/0013996 A1 | 1/2007 | Verma |
| 2007/0014318 A1 | 1/2007 | Hajjar et al. |
| 2007/0018102 A1 | 1/2007 | Braune et al. |
| 2007/0018558 A1 | 1/2007 | Chua et al. |
| 2007/0034833 A1 | 2/2007 | Parce et al. |
| 2007/0036510 A1 | 2/2007 | Ingman et al. |
| 2007/0036962 A1 | 2/2007 | Sasaki et al. |
| 2007/0045777 A1 | 3/2007 | Gillies et al. |
| 2007/0053208 A1 | 3/2007 | Justel et al. |
| 2007/0072979 A1 | 3/2007 | Moad et al. |
| 2007/0081329 A1 | 4/2007 | Chua et al. |
| 2007/0085092 A1 | 4/2007 | Chen et al. |
| 2007/0087197 A1 | 4/2007 | Jang et al. |
| 2007/0090755 A1 | 4/2007 | Eida et al. |
| 2007/0096078 A1 | 5/2007 | Lee et al. |
| 2007/0096634 A1 | 5/2007 | Krummacher |
| 2007/0098160 A1 | 5/2007 | Lablans |
| 2007/0103068 A1 | 5/2007 | Bawendi et al. |
| 2007/0108888 A1 | 5/2007 | Chen et al. |
| 2007/0112097 A1 | 5/2007 | Olson et al. |
| 2007/0112101 A1 | 5/2007 | Choi et al. |
| 2007/0112118 A1 | 5/2007 | Park et al. |
| 2007/0115995 A1 | 5/2007 | Kim et al. |
| 2007/0119951 A1 | 5/2007 | Auslander et al. |
| 2007/0121129 A1 | 5/2007 | Eida et al. |
| 2007/0131905 A1 | 6/2007 | Sato et al. |
| 2007/0138932 A1 | 6/2007 | Morioka et al. |
| 2007/0145350 A1 | 6/2007 | Kobori |
| 2007/0158668 A1 | 7/2007 | Tarsa et al. |
| 2007/0164661 A1 | 7/2007 | Kuma et al. |
| 2007/0170418 A1 | 7/2007 | Bowers et al. |
| 2007/0170447 A1 | 7/2007 | Negley et al. |
| 2007/0171188 A1 | 7/2007 | Waites |
| 2007/0177380 A1 | 8/2007 | Schultz et al. |
| 2007/0190675 A1 | 8/2007 | Yamazaki et al. |
| 2007/0200479 A1 | 8/2007 | Jean et al. |
| 2007/0200492 A1 | 8/2007 | Cok et al. |
| 2007/0201056 A1 | 8/2007 | Cok et al. |
| 2007/0223219 A1 | 9/2007 | Medendorp et al. |
| 2007/0235751 A1 | 10/2007 | Radkov et al. |
| 2007/0241661 A1 | 10/2007 | Yin |
| 2007/0246734 A1 | 10/2007 | Lee et al. |
| 2007/0262294 A1 | 11/2007 | Peterson et al. |
| 2007/0262714 A1 | 11/2007 | Bylsma |
| 2007/0263408 A1 | 11/2007 | Chua et al. |
| 2007/0281140 A1 | 12/2007 | Haubrich et al. |
| 2007/0298160 A1 | 12/2007 | Jang et al. |
| 2008/0001124 A1 | 1/2008 | Hachiya et al. |
| 2008/0001167 A1 | 1/2008 | Coe-Sullivan et al. |
| 2008/0001528 A1 | 1/2008 | Eida |
| 2008/0007156 A1 | 1/2008 | Gibson et al. |
| 2008/0012031 A1 | 1/2008 | Jang et al. |
| 2008/0029710 A1 | 2/2008 | Sekiya et al. |

(56) References Cited

U.S. PATENT DOCUMENTS

| | | |
|---|---|---|
| 2008/0037282 A1 | 2/2008 | Kurihara |
| 2008/0048936 A1 | 2/2008 | Powell et al. |
| 2008/0057342 A1 | 3/2008 | Sekiya |
| 2008/0062717 A1 | 3/2008 | Lee |
| 2008/0070153 A1 | 3/2008 | Ioku et al. |
| 2008/0074050 A1 | 3/2008 | Chen et al. |
| 2008/0084706 A1 | 4/2008 | Roshan et al. |
| 2008/0085088 A1 | 4/2008 | Lin et al. |
| 2008/0094829 A1 | 4/2008 | Narendran et al. |
| 2008/0106887 A1 | 5/2008 | Salsbury et al. |
| 2008/0117500 A1 | 5/2008 | Narendran et al. |
| 2008/0135914 A1 | 6/2008 | Krishna et al. |
| 2008/0144333 A1 | 6/2008 | Gourlay |
| 2008/0149958 A1 | 6/2008 | Reeh et al. |
| 2008/0165235 A1 | 7/2008 | Rolly et al. |
| 2008/0169753 A1 | 7/2008 | Skipor et al. |
| 2008/0172197 A1 | 7/2008 | Skipor et al. |
| 2008/0173886 A1 | 7/2008 | Cheon et al. |
| 2008/0218068 A1 | 9/2008 | Cok |
| 2008/0230120 A1 | 9/2008 | Reddy |
| 2008/0231170 A1 | 9/2008 | Masato et al. |
| 2008/0237510 A1 | 10/2008 | Dubrow |
| 2008/0237540 A1 | 10/2008 | Dubrow |
| 2008/0237611 A1 | 10/2008 | Cok et al. |
| 2008/0246017 A1 | 10/2008 | Gillies et al. |
| 2008/0252198 A1 | 10/2008 | Katano et al. |
| 2008/0254210 A1 | 10/2008 | Lai et al. |
| 2008/0276817 A1 | 11/2008 | Hinch et al. |
| 2008/0277626 A1 | 11/2008 | Yang et al. |
| 2008/0278063 A1 | 11/2008 | Cok |
| 2008/0308825 A1 | 12/2008 | Chakraborty et al. |
| 2009/0001385 A1 | 1/2009 | Skipor et al. |
| 2009/0017268 A1 | 1/2009 | Skipor et al. |
| 2009/0021148 A1 | 1/2009 | Hachiya et al. |
| 2009/0034292 A1 | 2/2009 | Pokrovskiy et al. |
| 2009/0050907 A1 | 2/2009 | Yuan et al. |
| 2009/0057662 A1 | 3/2009 | Brazis et al. |
| 2009/0059554 A1 | 3/2009 | Skipor et al. |
| 2009/0091239 A1 | 4/2009 | Cho et al. |
| 2009/0114932 A1 | 5/2009 | Chou |
| 2009/0140275 A1 | 6/2009 | Santori et al. |
| 2009/0152567 A1 | 6/2009 | Comerford et al. |
| 2009/0162011 A1 | 6/2009 | Coe-Sullivan et al. |
| 2009/0168415 A1 | 7/2009 | Deurenberg et al. |
| 2009/0173957 A1 | 7/2009 | Brunner et al. |
| 2009/0174022 A1 | 7/2009 | Coe-sullivan et al. |
| 2009/0181478 A1 | 7/2009 | Cox et al. |
| 2009/0196160 A1 | 8/2009 | Crombach et al. |
| 2009/0201577 A1 | 8/2009 | Laplante et al. |
| 2009/0208753 A1 | 8/2009 | Coe-Sullivan et al. |
| 2009/0212695 A1 | 8/2009 | Kim et al. |
| 2009/0215208 A1 | 8/2009 | Coe-Sullivan et al. |
| 2009/0215209 A1 | 8/2009 | Ano et al. |
| 2009/0236621 A1 | 9/2009 | Chakraborty |
| 2009/0236622 A1 | 9/2009 | Nishihara |
| 2009/0242871 A1 | 10/2009 | Kobayashi et al. |
| 2009/0251759 A1 | 10/2009 | Domash et al. |
| 2009/0263656 A1 | 10/2009 | Chae et al. |
| 2009/0272996 A1 | 11/2009 | Chakraborty |
| 2009/0274188 A1 | 11/2009 | Jang et al. |
| 2009/0278131 A1 | 11/2009 | Kwon et al. |
| 2009/0278141 A1 | 11/2009 | Coe-Sullivan et al. |
| 2009/0280586 A1 | 11/2009 | Coe-Sullivan et al. |
| 2009/0283742 A1 | 11/2009 | Coe-Sullivan et al. |
| 2009/0286338 A1 | 11/2009 | Coe-Sullivan et al. |
| 2009/0314991 A1 | 12/2009 | Cho et al. |
| 2009/0321755 A1 | 12/2009 | Jang et al. |
| 2010/0001256 A1 | 1/2010 | Coe-Sullivan et al. |
| 2010/0002414 A1 | 1/2010 | Meir et al. |
| 2010/0014799 A1 | 1/2010 | Bulovic et al. |
| 2010/0044635 A1 | 2/2010 | Breen et al. |
| 2010/0044636 A1 | 2/2010 | Ramprasad et al. |
| 2010/0044729 A1 | 2/2010 | Naum et al. |
| 2010/0051870 A1 | 3/2010 | Ramprasad |
| 2010/0051898 A1 | 3/2010 | Kim et al. |
| 2010/0051901 A1 | 3/2010 | Kazlas et al. |
| 2010/0052512 A1 | 3/2010 | Slough et al. |
| 2010/0067214 A1 | 3/2010 | Hoelen et al. |
| 2010/0068468 A1 | 3/2010 | Coe-Sullivan et al. |
| 2010/0079061 A1 | 4/2010 | Tsai et al. |
| 2010/0090597 A1 | 4/2010 | Werners et al. |
| 2010/0103648 A1 | 4/2010 | Kim et al. |
| 2010/0110728 A1 | 5/2010 | Dubrow et al. |
| 2010/0113813 A1 | 5/2010 | Pickett et al. |
| 2010/0123155 A1 | 5/2010 | Pickett et al. |
| 2010/0142183 A1 | 6/2010 | Lerenius |
| 2010/0144231 A1 | 6/2010 | Landry et al. |
| 2010/0149814 A1 | 6/2010 | Zhai et al. |
| 2010/0155749 A1 | 6/2010 | Chen et al. |
| 2010/0155786 A1 | 6/2010 | Heald et al. |
| 2010/0167011 A1 | 7/2010 | Dubrow |
| 2010/0193767 A1 | 8/2010 | Naasani et al. |
| 2010/0193806 A1 | 8/2010 | Byun |
| 2010/0208493 A1 | 8/2010 | Choi et al. |
| 2010/0246009 A1 | 9/2010 | Polley et al. |
| 2010/0265307 A1 | 10/2010 | Linton et al. |
| 2010/0265734 A1 | 10/2010 | Bulovic et al. |
| 2010/0283014 A1 | 11/2010 | Breen et al. |
| 2010/0283036 A1 | 11/2010 | Coe-Sullivan et al. |
| 2010/0283072 A1 | 11/2010 | Kazlas et al. |
| 2010/0289044 A1 | 11/2010 | Krames et al. |
| 2010/0314646 A1 | 12/2010 | Breen et al. |
| 2011/0068321 A1 | 3/2011 | Pickett et al. |
| 2011/0068322 A1 | 3/2011 | Pickett et al. |
| 2011/0081538 A1 | 4/2011 | Linton et al. |
| 2011/0103064 A1 | 5/2011 | Coe-Sullivan et al. |
| 2011/0127552 A1 | 6/2011 | Van Herpen et al. |
| 2011/0141769 A1 | 6/2011 | Lee et al. |
| 2011/0175054 A1 | 7/2011 | Ren et al. |
| 2011/0182056 A1 | 7/2011 | Trottier et al. |
| 2011/0186811 A1 | 8/2011 | Coe-Sullivan et al. |
| 2011/0233483 A1 | 9/2011 | Breen et al. |
| 2011/0241229 A1 | 10/2011 | Naasani et al. |
| 2011/0303940 A1 | 12/2011 | Lee et al. |
| 2011/0309325 A1 | 12/2011 | Park et al. |
| 2012/0075837 A1 | 3/2012 | Um |
| 2012/0113671 A1 | 5/2012 | Sadasivan et al. |
| 2012/0113672 A1 | 5/2012 | Dubrow et al. |
| 2012/0155115 A1 | 6/2012 | Jang et al. |
| 2012/0187367 A1 | 7/2012 | Modi et al. |
| 2012/0189791 A1 | 7/2012 | Modi et al. |
| 2012/0286238 A1 | 11/2012 | Linton et al. |
| 2013/0032768 A1 | 2/2013 | Arbell et al. |
| 2013/0099212 A1 | 4/2013 | Jang et al. |
| 2013/0114301 A1 | 5/2013 | Um |
| 2013/0215136 A1 | 8/2013 | Jiao et al. |

FOREIGN PATENT DOCUMENTS

| | | |
|---|---|---|
| JP | 05-152609 | 6/1993 |
| JP | 07-176794 | 7/1995 |
| JP | 08-007614 | 12/1996 |
| JP | 09-080434 | 3/1997 |
| JP | H-09304623 | 11/1997 |
| JP | 2002-091352 | 3/2002 |
| JP | 2002-216962 | 8/2002 |
| JP | 2002525394 A | 8/2002 |
| JP | 2004-071357 | 3/2004 |
| JP | 2005038768 | 2/2005 |
| JP | 2006059723 | 3/2006 |
| JP | 2006073202 | 3/2006 |
| JP | 2006073869 | 3/2006 |
| JP | 2006190679 | 7/2006 |
| JP | 2006278082 | 10/2006 |
| JP | 2007073206 | 3/2007 |
| JP | 2007103099 | 4/2007 |
| JP | 20071035132 | 4/2007 |
| KR | 100724035 B1 | 5/2007 |
| KR | 100800502 | 7/2007 |
| KR | 20080032473 | 4/2008 |
| KR | 1020100015662 A | 2/2010 |
| KR | 20110012246 | 2/2011 |
| KR | 20110044002 | 4/2011 |
| KR | 20110065053 | 6/2011 |

(56) References Cited

FOREIGN PATENT DOCUMENTS

| | | |
|---|---|---|
| KR | 20110068109 | 6/2011 |
| WO | 0017655 A1 | 3/2000 |
| WO | 2006118954 A2 | 11/2006 |
| WO | WO-2007046649 | 4/2007 |
| WO | 2007117668 A2 | 10/2007 |
| WO | 2007117672 A2 | 10/2007 |
| WO | 2007117698 A2 | 10/2007 |
| WO | 2007120877 A2 | 10/2007 |
| WO | WO-2008029633 A1 | 3/2008 |
| WO | WO-2009002512 | 12/2008 |
| WO | 2009035657 A1 | 3/2009 |
| WO | WO-2009137053 A1 | 11/2009 |
| WO | WO-2009151515 A1 | 12/2009 |
| WO | WO-2011020098 | 2/2011 |
| WO | WO-2012012675 A1 | 1/2012 |
| WO | WO-2012135744 | 10/2012 |

OTHER PUBLICATIONS

Notice of Allowance dated Apr. 5, 2017 of the corresponding Korean Patent Application No. 10-2011-7028142.
Office Action dated May 8, 2017 of the corresponding U.S. Appl. No. 14/853,263.
EP Official Communication dated May 13, 2014 in EP 09762812.7 which is the EPO counterpart of copending U.S. Appl. No. 12/940,355.
JP Reexamination Report dated Apr. 23, 2014 in Japanese Patent Application No. JP-2010514795 which is the Japanese counterpart of U.S. Pat. No. 8,718,437.
English translation of JP Notice of Rejection dated Nov. 4, 2014 in Japanese Patent Application No. JP-2013-252719 which is a divisional of Japanese Patent Appliaticn No. JP-2010514795, which is the Japanese counterpart of U.S. Pat. No. 8,718,437.
KR Notice of Preliminary Rejection dated Sep. 5, 2014 in Korean Patent Application No. 10-2010-7001542 which is the Japanese counterpart of U.S. Pat. No. 8,718,437.
Yeh, D.M., et al., "Making white-light-emitting diodes without phosphors", *SPIE* Illumination & Displays (2008), SPIE DigitalLibrary.org.
Yu, H., et al., "Quantum dot and silica nanoparticle doped polymer optical fibers", *Optics Express* (2007), vol. 15, No. 16.
Ashdown, I., et al., "Six-color mixing and warm-white/green/blue offer new approaches to generating white LED light" LEDs Magzine, Oct. 2006, pp. 19-21.
Chinese Office Action, dated Mar. 7, 2014, in Chinese Patent Application No. CN2010880046736.2, which is the Chinese counterpart of copending U.S. Appl. No. 13/372,262. (English translation).
Chinese Search Report, dated Feb. 27, 2014, in Chinese Patent Application No. CN2010880046736.2, which is the Chinese counterpart of copending U.S. Appl. No. 13/372,262. (English translation).
Dabbousl, B. O., et al., "(CdSe)ZnS Core-Shell Quantum Dots: Synthesis and Characterization of a Size Series of Highly Luminescent Nanocrystallites", *J. Phys. Chem. B* 1997, vol. 101, p. 9463.
DeMello et al., "An Improved Experimental Determination of External Photoluminescence Quantum Efficiency", Advanced Materials 9(3):230 1997.
EP Official Communication dated Aug. 20, 2012 in EP 09762812.7 which is the EPO counterpart of copending U.S. Appl. No. 12/940,355.
EP Supplementary European Search Report dated Oct. 31, 2011 in EP 09762812.7 which is the EPO counterpart of copending U.S. Appl. No. 12/940,355.
Final rejection dated Aug. 6, 2013 in Japanese Patent Application No. JP-2010514795 which is the Japanese counterpart of U.S. Pat. No. 6,718,437. (English translation).
Firth, et al., "Optical Properties of CdSe nanocrystals in a polymer matrix", Applied Physics Letters, vol. 75, No. 20, 3120 at seq. (1999).
Fuchs, D.T., et al., "Making waveguides containing nanocrystalline quantum dots", Proc. of SPIE, vol. 5592 (SPIE Bellingham, WA 2005).
Goetz, W., et al., "Development of Key Technologies for White Lighting Based on Light-Emitting diodes (LEDs)", Final Report dated Jun. 2004, DOE Award No. DE-FC26-01NT41251.
Green, P., et al., "Compare/Contrast of Thin Film EL (TFEL) to EL Backlighting, LED, and OLED Technologies", Dec. 13, 2007.
Japanese Office Action dated Dec. 10, 2013 in JP Patent Application No. 2011-508496, which is the Japanese counterpart of copending U.S. Appl. No. 12/940,355. (English translation).
Japanese Office Action dated May 14, 2013 in JP Patent Application No. 2011-508496, which is the Japanese counterpart of copending U.S. Appl. No. 12/940,355. (English translation).
Japanese Office Action, dated Mar. 4, 2014, in Japanese Patent Application No. JP2012-524933, which is the Japanese counterpart of copending U.S. Appl. No. 13/372,262. (English translation).
Jones-Bey, H., "Quantum-dot research targets general Illumination", Laser Focus World (world wide web—laserfocusworld—dot-com), Mar. 2006.
Kortan, et al., "Nucleation and Growth of CdSe on ZnS Quantum Crystallite Seeds, and Vice Versa, in Inverse Micelle Media", J. Amer. Chem. Soc., 1990, 112, 1327.
Kumar, A., et al., "Features of gold having micrometer to centimeter dimensions can be formed through a combination of stamping with an elastomeric stamp and an alkanethiol 'ink' followed by chemical etching", *Appl. Phys. Lett.*, 63, pp. 2002-2004, (1993).
Lee, J., et al., "Full Color Emission from II-VI Semiconductor Quantum Dot-Polymer Composites" Adv. Mater. 2000, 12, No. 15, Aug. 2.
Lim, J; et al., "Preparation of Highly Luminescent Nanocrystals and Their Application to Light-Emitting Diodes", Adv. Mater., 2007, 19, 1927-1932.
Mannan, O., "Creating White Light Utilizing Remote Phosphor Technology", Future Electronics, FTM, Oct. 2011, p. 26-27.
Masui, H., et al., "Effects of Phosphor Application Geometry on White Light-Emitting Diodes", The Japan Society of Applied Physics, vol. 45, No. 34, 2006, pp. L910-L912.
Mueller-Mach, R., et al., "High-Power Phosphor-Converted Light-Emitting Diodes Based on III-Nitrides", IEEE Journal on Selected Topics in Quantum Electronics, vol. 8, No. 2, 339-345 (Mar./Apr. 2002).
Murray, C., PhD. Thesis entitled "Synthesis and Characterization of II-VI Quantum Dots and Their Assembly into 3-D Quantum Dot Superlattices", Massachusetts Institute of Technology, Sep. 1995.
Murray, C.B. et al., "Synthesis and Characterization of Nearly Monodisperse CdE (E = S, Se, Te) Semiconductor Nanocrystallites" 1993 American Chemical Society, 115.
Narendran, N., et al., "Extracting phosphor-scattered photons to improve white LED efficiency", Phys. Stat. Sol. (a) 202, No. 6, R60-R62 (2005).
Non-final Office Action in copending U.S. Appl. No. 13/372,262 dated Dec. 17, 2012.
Nonfinal Office Action dated Mar. 19, 2014 in copending U.S. Appl. No. 12/940,355, filed Nov. 5, 2010 of Coe-Sullivan et al.
Notice of Allowance in copending U.S. Appl. No. 12/940,343 dated Oct. 2, 2014.
Notice of Allowance in copending U.S. Appl. No. 13/372,262 dated Jun. 2, 2014.
Notice of Rejection dated May 8, 2012 in Japanese Patent Application No. JP-2010514795 which is the Japanese counterpart of U.S. Pat. No. 8,718,437, (English translation).
Ohno, Y., "Color Issues of White LEDs", Preprint: A section in "Solid State Light Emitting Diodes for General Illumination", OIDA Workshop Preliminary Report, Oct. 26-27, 2000, also in "OLEDS for General Illumination", OIDA Workshop Preliminary Report, Nov. 30-Dec. 1, 2000.
Olsson, Y.K., et al., "Fabrication and optical properties of polymeric waveguides containing nanocrystalline quantum dots", Appl., Phys. Lett., vol. 85, No. 19, Nov. 8, 2004, pp. 4469-4471.

(56) References Cited

OTHER PUBLICATIONS

Pang, et al., "PMMA Quantum Dots Composites Fabricated via use of Pre-polymerization", Optics Express, vol. 13, No. 1, Jan. 10, 2005.

PCT International Search Report and Written Opinion, dated Oct. 6, 2010, in copending International Application No. PCT/US2006/07902 of QD Vision, Inc.

PCT International Search Report and Written Opinion, dated Sep. 11, 2008, in copending International Application No. PCT/US2010/045624 of QD Vision, Inc.

PCT International Search Report and Written Opinion, dated Nov. 13, 2009 in copending International Application No. PCT/US2009/002789 of QD Vision, Inc.

PCT International Search Report and Written Opinion, dated Jun. 23, 2009 in parent International Application No. PCT/US2009/002796 of QD Vision, Inc.

Rohwer, et al., "Development of solid state light sources based on II-VI semiconductor quantum dots", Proc. of SPIE vol. 5366 (2004).

Sadasivan, et al., "LED Backlighting with Quantum Dots", SID, IDW '10, conference proceeding and abstract of invited paper from the 17th International Display Workshops, held at Fukuoka International Congress Center, Fukuoka, Japan, Dec. 1-3, 2010.

Santhanam, V. et al., "Microcontact Printing of Uniform Nanoparticle Arrays", *Nano Letters*, 4, (2004), pp. 41-44.

Schlotter, P., et al., "Luminescence conversion of blue light emitting diodes", Appl. Phys. A 64, 417-418 (1997).

Song, H.; et al., "Photoluminescent (CdSe)ZnS quantum dot-polymethylmethacrylate polymer composite thin films in the visible range", Nanotechnology 18 (2007) 055401 (6 pp).

Steigerwald, D., et al., "Illumination With Solid State Lighting Technology", IEEE Journal on Selected Topics in Quantum Electronics, vol. 8, No. 2, 310-320 (Mar./Apr. 2002).

US Department of Energy, "Understanding Photometric Reports for SSL Products", PNNL-SA-67277 Jun. 2009.

Ziegler, J., et al., "Silica-coated InP/ZnS Nanocrystals as Converter Material in White LEDs", Adv, Mater. 2008, 20, 4068-4073.

Ziegler, Jan, "Ph/D/ thesis" Preparation and application of nanocrystals for white LEDs, Oct. 1, 2007. School of Chemical Sciences and Pharmacy, Univeristy of East anglia, Norwich UK, Norwich, UK.

1) Light source
2) Light guide plate comprising quantum confined semiconductor nanoparticles dispersed or embedded therein 1) Light source
2) Light guide plate
3) Light Coupling Means

LIGHTING SYSTEMS AND DEVICES INCLUDING SAME

This application is a continuation of U.S. patent application Ser. No. 15/948,755 filed 9 Apr. 2018, which is a continuation of U.S. patent application Ser. No. 14/960,633 filed 7 Dec. 2015, which claims priority to U.S. patent application Ser. No. 12/944,681 filed 11 Nov. 2010, which is hereby incorporated herein by reference in its entirety. U.S. patent application Ser. No. 12/944,681 claims priority from U.S. Application No. 61/260,311 filed 11 Nov. 2009.

U.S. patent application Ser. No. 12/944,681 is also a continuation-in-part application of U.S. application Ser. No. 12/940,343 filed 5 Nov. 2010, which issued as U.S. Pat. No. 9,140,844 on 22 Sep. 2015, which is a continuation of International Application No. PCT/US2009/002796, filed 6 May 2009, which PCT Application claims priority from U.S. Patent Application No. 61/050,929, filed 6 May 2008.

TECHNICAL FIELD OF THE INVENTION

The present invention relates to the technical field of lighting systems and devices, and more particularly to lighting systems and devices including nanoparticles.

SUMMARY OF THE INVENTION

In accordance with one aspect of the invention, there is provided a lighting system comprising at least one light source comprising a light emitting diode (LED) and one or more phosphors optically coupled to the LED to convert at least a portion of original light emitted by the LED to provide a modified LED light having a first predetermined spectral output, and an optical material that is optically coupled to at least a portion of a surface of a light guide plate and optically coupled to receive at least a portion of the modified LED light and to convert at least a portion of the modified LED light to at least one predetermined wavelength to provide modified light having a second predetermined spectral output, wherein the optical material comprises one or more types of quantum confined semiconductor nanoparticle.

In certain embodiments, the modified light having a second predetermined spectral output is emitted from the lighting system.

In certain embodiments, the second predetermined spectral output includes red peak emission, blue peak emission, and green peak emission.

In certain embodiments, a lighting system further comprises means for coupling light from the light source into the light guide plate.

In certain embodiments, the light guide plate is directly optically coupled to the light source.

In certain embodiments, the light guide plate is indirectly optically coupled to the light source, e.g., one or more of the optical material, another layer, and/or component is positioned therebetween.

In certain embodiments, at least a portion of at least one type of quantum confined semiconductor nanoparticles included in the optical material is capable of converting the wavelength of at least a portion of light coupled into the light guide plate from the light source to one or more predetermined wavelengths.

In certain embodiments, the optical material is positioned between the light source and the light guide plate.

In certain embodiments, the optical material is positioned between the light source and an edge surface of the light guide plate.

In certain embodiments, the optical material is positioned between the light source and a major surface of the light guide plate.

In certain embodiments, the light guide plate is positioned between the light source and the optical material.

In certain embodiments, the optical material is included in a layer disposed over at least a portion of surface of the light guide plate.

In certain embodiments, the optical material is included in a layer disposed over a predetermined region of a surface of the light guide plate.

In certain embodiments, the optical material is included in a layer disposed over at least a portion of a major surface of the light guide plate.

In certain embodiments, the optical material is included in a layer disposed over at least a portion of an edge surface of the light guide plate.

In certain embodiments, one or more optional layers or materials may be included between the surface of the light guide plate and the optical material.

The optical material included in the lighting system of the invention comprises one or more types of quantum confined semiconductor nanoparticle.

In certain embodiments, the optical material comprises one or more types of quantum confined semiconductor nanoparticles selected to convert at least a portion of the light received from the light source to light emission having a predetermined wavelength.

In certain embodiments, each type of quantum confined semiconductor nanoparticles emits light having a predetermined wavelength that is distinct from that emitted by of at least one of the other types of quantum confined semiconductor nanoparticles that may be included in the optical material.

In certain embodiments, the optical material includes quantum confined semiconductor nanoparticles in an amount effective to absorb from about 1 to about 50% of light emitted from the light source.

In certain embodiments, the optical material includes quantum confined semiconductor nanoparticles in an amount effective to absorb from about 1 to about 80% of light emitted from the light source.

In certain embodiments, the optical material includes quantum confined semiconductor nanoparticles in an amount effective to absorb from about 1 to about 90% of light emitted from the light source.

Preferably, the quantum confined semiconductor nanoparticles absorb at least a portion of impinging light and reemit at least a portion of the absorbed light energy as one or more photons of a predetermined wavelength(s). Most preferably, the quantum confined semiconductor nanoparticles do not absorb any, or absorb only negligible amounts of, the re-emitted photons.

In certain embodiments, the optical material comprises quantum confined semiconductor nanoparticles having a solid state quantum efficiency of at least about 35%.

In certain embodiments, the optical material further comprises light scatterers.

In certain embodiments, the optical material includes at least one type of quantum confined semiconductor nanoparticle capable of emitting red light.

In certain embodiments, the optical material includes at least one type of quantum confined semiconductor nanoparticle capable of emitting green light.

In certain embodiments, the optical material includes at least one type of quantum confined semiconductor nanoparticle capable of emitting blue light.

In certain embodiments, the optical material includes quantum confined semiconductor nanoparticles that are cadmium free.

In certain embodiments, the optical material includes at least one type of quantum confined semiconductor nanoparticle comprising a III-V semiconductor material.

In certain embodiments, the optical material includes at least one type of quantum confined semiconductor nanoparticle a semiconductor nanocrystal including a core comprising a III-V semiconductor material and an inorganic shell disposed on at least a portion of a surface of the core.

In certain embodiments, the optical material further comprises a host material in which the quantum confined semiconductor nanoparticles are distributed.

In certain embodiments, the host material is optically transparent. In certain embodiments, the nanoparticles are uniformly distributed in the host material.

In certain embodiments in which quantum confined semiconductor nanoparticles are included in a host material, the nanoparticles are included in an amount in the range from about 0.001 to about 5 weight percent of the weight of the host material.

In certain embodiments, the optical material further includes scatterers in an amount in the range from about 0.001 to about 5 weight percent of the weight of the optical material.

In certain embodiments, the quantum confined semiconductor nanoparticles comprise a core/shell structure.

In certain embodiments, the optical material is spaced from the light source.

In certain embodiments, the temperature at the location of the nanoparticles during operation of the lighting system is less than 90° C.

In certain embodiments, the temperature at the location of the nanoparticles during operation of the lighting system is less than 75° C.

In certain embodiments, the temperature at the location of the nanoparticles during operation of the lighting system is 60° C. or less.

In certain embodiments, the optical material does not include phosphor particles.

In certain embodiments, the light guide plate does not include phosphor particles.

In certain aspects and embodiments of the invention described herein, an optical material does not include phosphor particles.

In certain embodiments, the light guide plate is at least 90% transparent to light coupled to it.

In certain embodiments, the light guide plate is at least 99% transparent to light coupled to it.

In certain embodiments a light guide plate can comprise a rigid material, e.g., glass, polycarbonate, thick acrylic, quartz, sapphire, or other known rigid materials with light guide plate characteristics.

In certain embodiments, a light guide plate can comprise a flexible material, e.g., a polymeric material such as plastic or silicone (e.g. but not limited to thin acrylic, epoxy, PEN, PET, PE).

In certain embodiments, a light guide plate can comprise be planar.

In certain embodiments, at least the texture of the surface of the light guide plate from which light is emitted is selected to enhance or otherwise alter the pattern, angle, or other feature of light transmitted therethrough. For example, in certain embodiments, the surface may be smooth; in certain embodiments, the surface may be non-smooth (e.g., the surface is roughened or the surface includes one or more raised and/or depressed features); in certain embodiments, the surface may include both smooth and non-smooth regions.

In certain embodiments and aspects of the inventions described herein, the geometrical shape and dimensions of a light guide plate can be selected based on the particular end-use application. In certain embodiments, the thickness of the light guide plate can be substantially uniform. In certain embodiments, the thickness of the light guide plate can be non-uniform (e.g., tapered).

In certain embodiments and aspects of the inventions described herein, a light guide plate comprises a thin flexible component. In certain embodiments, the thickness of the light guide plate is less than or equal to about 1000 microns. In certain embodiments, the thickness of the component is less than or equal to about 500 microns. In certain embodiments, the thickness of the component is in a range from 10 to about 200 microns.

In certain embodiments, the light source is optically coupled to an edge of the light guide plate.

In certain embodiments, outcoupling structures are include across a surface of the light guide plate.

In certain embodiments, outcoupling structures are include over a surface of the light guide plate, e.g., as a separate layer or component.

In certain embodiments, outcoupling structures can be positive, negative, or a combination of positive and negative.

In certain embodiments, optical material can be is applied to a surface of a positive outcoupling structure and/or within a negative outcoupling structure.

In certain embodiments, the lighting system does not include a filter layer.

In certain embodiments, the lighting system can include a filter layer. In certain embodiments, the filter layer can be included over or under the optical material.

In certain embodiments, the filter layer blocks passage of one or more predetermined wavelengths of light.

In certain embodiments, the lighting system includes more than one filter layer.

In certain embodiments, optical material is included in a layer disposed over a predetermined area of a surface of the light guide plate. In certain of such embodiments, the layer has a thickness from about 0.1 to about 200 microns.

In certain embodiments comprising optical material included in a layer, the optical material further comprises a host material in which the quantum confined semiconductor nanoparticles are distributed.

In certain of such embodiments, quantum confined semiconductor nanoparticles are included in the host material in an amount in the range from about 0.001 to about 5 weight percent of the weight of the host material.

In certain embodiments comprising optical material included in a layer, the optical material further comprises scatterers in an amount in the range from about 0.001 to about 5 weight percent of the weight of the optical material.

In certain embodiments comprising optical material included in the layer, the optical material further comprises the layer is sufficiently thick so as to absorb light incident thereon.

In certain embodiments, the light source comprises more than one LED.

In certain embodiments, the light source comprises one or more blue light-emitting LEDs.

In certain embodiments, the light source comprises one or more UV light-emitting LEDs.

In certain embodiments, one or more of the LEDs included in the light source is encapsulated with an encapsulant including one or more phosphors.

In certain embodiments, a lighting system includes a light source comprising at least one blue LED including one or more phosphors to provide an off-white modified LED light that includes a spectral output including at least one spectral component in a first spectral region from about 360 nm to about 475 nm, at least one spectral component in a second spectral region from about 475 nm to about 575 nm. In certain of such embodiments, the optical material can comprise at least one type of quantum confined semiconductor nanoparticle that is capable of emitting red light.

In certain embodiments, a lighting system includes a light source comprising at least one blue LED including one or more phosphors to provide a white modified LED light. In certain of such embodiments, the optical material can comprise at least one type of quantum confined semiconductor nanoparticle that is capable of emitting red light. In certain embodiments, the white modified LED light has a color deficiency in the red spectral region; and the optical material optically coupled to receive at least a portion of the modified white LED light includes at least one type of quantum confined semiconductor nanoparticles selected to convert at least a portion of the modified white LED to light in the red spectral region, such that the light emitted by the lighting system includes white light emission from the LED light source supplemented with light emission in the red spectral region. The addition of the red emission component can improve the useful front-screen power of the lighting system without increasing the power requirements thereof. For example, in such embodiments, using red-emitting quantum confined semiconductor nanoparticles to down convert the white (blue plus yellow phosphor) light from a typical LED can generate a greater quantity of useful front of screen luminance than can be achieved without the additional red emitting material. For a fixed amount of input electrical power, more useful optical power may be produced, or alternatively for the same front of screen brightness, less electrical power would need to be consumed from the power source.

In certain embodiments, a lighting system includes a light source comprising at least one blue LED including one or more phosphors to provide a white modified LED light and the optical material comprises a first type of quantum confined semiconductor nanoparticle capable of emitting red light and a second type of quantum confined semiconductor nanoparticle capable of emitting green light.

In certain embodiments, a lighting system includes a light source comprising at least one blue LED including one or more phosphors to provide an off-white modified LED light that includes a spectral output including at least one spectral component in a first spectral region from about 360 nm to about 475 nm, at least one spectral component in a second spectral region from about 475 nm to about 575 nm and the optical material comprises a first type of quantum confined semiconductor nanoparticle capable of emitting red light and a second type of quantum confined semiconductor nanoparticle capable of emitting green light.

In accordance with another aspect of the invention, there is provided a device including a lighting system taught herein.

In certain embodiments, a device comprises a liquid crystal display including a lighting system taught herein.

In certain embodiments, a device comprises a cell phone including a lighting system taught herein.

In certain embodiments, a device comprises a laptop computer including a lighting system taught herein.

In certain embodiments, a device comprises a display including a lighting system taught herein.

In certain embodiments, a device comprises a portable electronic device including a lighting system taught herein.

In accordance with another aspect of the present invention, there is provided a back light unit for a liquid crystal display, the unit comprising a lighting system taught herein.

In certain embodiments, a back light unit includes one or more red subpixels and wherein the red subpixel power efficiency is improved by a factor of greater than 1 up to about 3 compared to a backlight unit that utilizes a red filter to add a red In certain embodiments and aspects of the inventions described herein, the quantum confined semiconductor nanoparticles have an average particle size in a range from about 1 to about 100 nanometers (nm). In certain embodiments, the quantum confined nanoparticles have an average particle size in a range from about 1 to about 20 nm. In certain embodiments, the quantum confined semiconductor nanoparticles have an average particle size in a range from about 2 to about 10 nm.

Preferably, ligands are attached to a surface of at least a portion of the quantum confined semiconductor nanoparticles.

In certain embodiments and aspects of the inventions described herein including quantum confined semiconductor nanoparticles, the quantum confined semiconductor nanoparticles comprise semiconductor nanocrystals. In certain embodiments the quantum confined semiconductor nanoparticles comprise semiconductor nanocrystals including a core/shell structure.

In certain aspects and embodiments of the invention described herein, quantum confined semiconductor nanoparticles comprise semiconductor nanocrystals wherein at least a portion of the semiconductor nanocrystals include one or more ligands attached to a surface thereof.

The foregoing, and other aspects and embodiments described herein all constitute embodiments of the present invention.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

Figure 1:
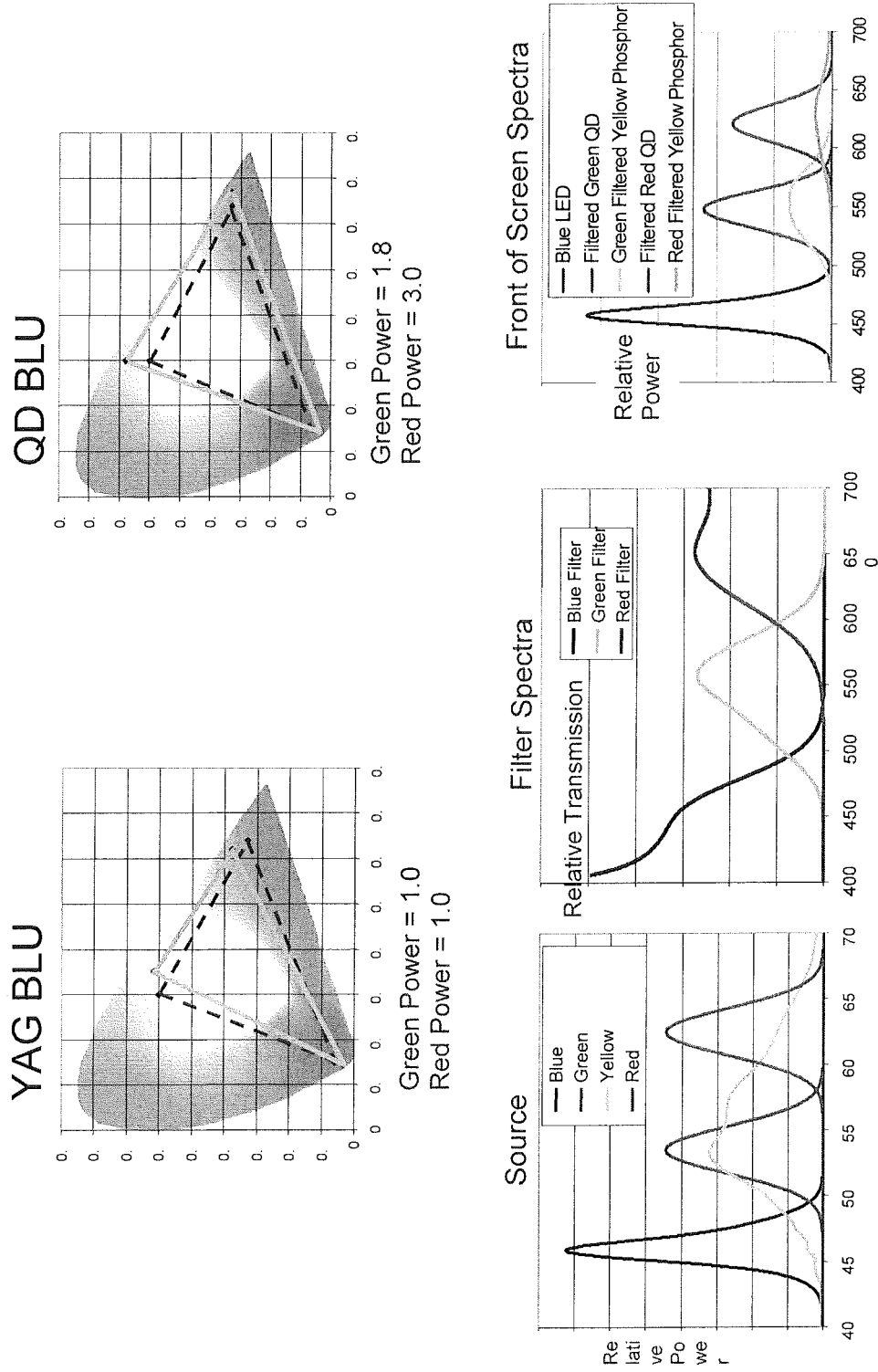
FIG. 1 depicts CIE diagrams and spectra to illustrate expected advantages for certain embodiments of the present invention.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

Quantum confined semiconductor nanoparticles can confine electrons and holes and have a photoluminescent property to absorb light and re-emit different wavelength light. Color characteristics of emitted light from quantum confined semiconductor nanoparticles depend on the size of the quantum confined semiconductor nanoparticles and the chemical composition of the quantum confined semiconductor nanoparticles.

In certain embodiments, the quantum confined semiconductor nanoparticles include at least one type of quantum confined semiconductor nanoparticle with respect to chemical composition and size. The type(s) of quantum confined semiconductor nanoparticles included in an optical material in accordance with the invention are determined by the wavelength of light to be converted and the wavelengths of the desired light output. As discussed herein, quantum confined semiconductor nanoparticles may or may not include a shell and/or a ligand on a surface thereof. A shell and/or ligand can passivate quantum confined semiconductor nanoparticles to prevent agglomeration or aggregation to overcome the Van der Waals binding force between the nanoparticles. In certain embodiments, the ligand can comprise a material having an affinity for any host material in which a quantum confined semiconductor nanoparticle may be included. As discussed herein, in certain embodiments, a shell comprises an inorganic shell.

In a lighting system described herein, the optical material, when optically coupled (whether directly or indirectly to the light source) can alter the wavelength or other characteristic of at least a portion of light emitted from the light source. In such application, quantum confined semiconductor nanoparticles are selected to have a bandgap smaller than the energy of at least a portion of the original light emitted from the light source In accordance with one aspect of the invention, there is provided a lighting system comprising at least one light source comprising a light emitting diode (LED) and one or more phosphors optically coupled to the LED to convert at least a portion of original light emitted by the LED to provide a modified LED light having a first predetermined spectral output, and an optical material that is optically coupled to at least a portion of a surface of a light guide plate and optically coupled to receive at least a portion of the modified LED light and to convert at least a portion of the modified LED light to at least one predetermined wavelength to provide modified light having a second predetermined spectral output, wherein the optical material comprises one or more types of quantum confined semiconductor nanoparticle.

In certain embodiments of the present invention there is provided a lighting system that includes, e.g., a light source comprising at least one white LED, and an optical material comprising red-emitting quantum confined semiconductor nanoparticles such that a red emission component is added to the light output of the lighting system. The addition of the red emission component can improve the useful front-screen power of the lighting system without increasing the power requirements thereof. For example, in such embodiments, using red-emitting quantum confined semiconductor nanoparticles to down convert the white (blue LED plus yellow phosphor) light from an example of typical LED can generate a greater quantity of useful front of screen luminance than can be achieved without the additional red emitting material. For a fixed amount of input electrical power, more useful optical power may be produced, or alternatively for the same front of screen brightness, less electrical power would need to be consumed from the power source.

To better understand the expected benefits and advantages of such lighting systems, reference is made to FIG. 1. FIG. 1 includes "Source "Spectra" to illustrate examples of spectra of interest for the following various light sources: blue LED spectra which is converted to white light using the yellow phosphor; and spectra for red and green emitting quantum confined semiconductor nanoparticles (shown for comparison) that emphasize the saturated color emission expected if substituted or added to the yellow phosphor spectra.

FIG. 1 also includes "Filter Spectra" to illustrate a typical transmission function for an LCD color spectra. Front of screen useful power is limited to the light that is effectively transmitted by the LCD color filter array.

"Front of Screen Spectra" included in FIG. 1 to illustrate the predicted resulting power output of the light sources after being transmitted through the color filters. The greater peak height and peak width is indicative of the improved color saturation and increased power throughput expected for certain embodiments of a lighting system m accordance with the invention.

Also illustrated in FIG. 1 is a "YAG BLU" CIE diagram, depicting color points expected for a typical YAG phosphor emission after transmission through color filters. The "QD BLU" CIE diagram depicts the expected improved color gamut derived by using quantum confined semiconductor nanoparticles instead of or in addition to the phosphor material, while simultaneously delivering higher power efficiency.

The wide band phosphors that are typically used on top of the blue LED (e.g., yellow) are designed to span both the red and green channels of the color filter array included in an LCD display, and hence the red color filter channel trades off color purity for power efficiency (as does the green). By using a narrow band red down converting material (e.g., red emitting quantum confined semiconductor nanoparticles) the red LCD channel can be saturated red light (CIE x>0.64) without sacrificing as much power transmission through the color filter. The same concept applies to the green, but has less differential advantage since the yellow phosphor provides a more significant green component than it provides in the red.

In certain embodiments, a lighting system in accordance with the invention can add saturated red light to the light source light output. This can provide more saturated red color for the same power input, or equivalent red power for lower electrical power consumption. Also, the inclusion of quantum confined semiconductor nanoparticles on the light guide plate rather than on or adjacent to the light source allows for a lower operating temperature at the optical material including quantum confined semiconductor nanoparticles, hence enabling significant lifetime of operation which may be compatible with the commercial uses for mobile applications (1,000 hours to 20,000 hours).

In certain embodiments, a light guide plate can include an optical material comprising a host material and quantum confined semiconductor nanoparticles. Optionally, scatterers and/or other additives can also be included in the material.

In certain embodiments, a light guide plate includes at least one layer including an optical material comprising quantum confined semiconductor nanoparticles. Examples of compositions are described below. Other optional layers may also be included.

In certain embodiments, for example, a light guide plate may further include outcoupling members or structures across a surface thereof, e.g., a major surface and/or an edge surface. In certain embodiments, outcoupling members or structures may be uniformly distributed across a surface of the light guide plate. In certain embodiments, outcoupling members or structures may vary in shape, size, and/or frequency in order to achieve a more uniform light distribution outcoupled from the surface. In certain embodiments, outcoupling members or structures may be positive, e.g., sitting or projecting above the surface of the light guide plate, or negative, e.g., depressions in the surface of the light guide plate, or a combination of both. In certain embodiments, an optical material including a host material and quantum confined semiconductor nanoparticles can be applied to a surface of a positive outcoupling member or structure and/or within a negative outcoupling member or structure. In certain embodiments, the optical material may be applied to the surface of the light guide plate opposite of the outcoupling members or structures. In certain embodiments, an outcoupling member or structure can comprise an optical material including a host material and quantum confined semiconductor nanoparticles.

In certain embodiments, outcoupling members or structures can be formed by molding, embossing, lamination, applying a curable formulation (formed, for example, by techniques including, but not limited to, spraying, lithography, printing (screen, inkjet, flexography, etc), etc.).

In certain embodiments, quantum confined semiconductor nanoparticles included in an optical material is from about 0.001 to about 5 weight percent quantum confined semiconductor nanoparticles based on the weight of the optical material. In certain preferred embodiments, the effective amount is from about 0.01 to about 2 weight percent quantum confined semiconductor nanoparticles based on the weight of the optical material. In certain more preferred embodiments, the composition includes from about 0.01 to about 1 weight percent quantum confined semiconductor nanoparticles based on the weight of the optical material. In certain embodiments including scatterers, the optical material includes from about 0.001 to about 5 weight percent scatterers based on the weight of the optical material.

In certain embodiments, the optical material (e.g., comprising quantum confined semiconductor nanoparticles dispersed in a host material (preferably a polymer or glass)) is exposed to light flux for a period of time sufficient to increase the photoluminescent efficiency of the optical material. In certain embodiments, the optical material is exposed to light and heat for a period of time sufficient to increase the photoluminescent efficiency of the optical material. In certain embodiments, the exposure to light or light and heat is continued for a period of time until the photoluminescent efficiency reaches a substantially constant value. In certain embodiments, an LED light source with peak wavelength of about 450 nm is used as the source of light flux. Other known light sources can be readily identified by the skilled artisan. In certain embodiments, the light flux is from about 10 to about 100 mW/cm$^2$, preferably from about 20 to about 35 mW/cm$^2$, and more preferably from about 20 to about 30 mW/cm$^2$. In embodiments that include exposing the optical material to light and heat, the optical material is exposed to light while at a temperature in a range from about 25° to about 80° C. In certain embodiments, the optical material can be fully or partially encapsulated when exposed to light, whether or not heat is also applied.

In certain embodiments, the optical material is disposed over an edge surface of the light guide plate.

In certain embodiments, the optical material is disposed between the light source and the light guide plate.

In certain embodiments, the optical material is disposed over a major surface of the light guide plate.

In certain embodiments, the optical material is disposed across a major surface of the light guide plate.

In certain embodiments, the optical material is sandwiched between light guide plates.

In certain embodiments, the optical material is disposed as an uninterrupted layer over a surface of the light guide plate.

In certain embodiments, the optical material comprises a plurality of features on a major surface of the light guide plates, the plurality of features can be arranged in a pattern. In certain of such embodiments, each feature can have a shape that is the same or similar to the shape of the other features. In certain of such embodiments, the shapes of all of the features need not be the same or similar.

In certain embodiments including a layer of optical material including quantum confined semiconductor nanoparticles dispersed in a host material that is disposed across all or a predetermined area of a surface of a light guide plate, the concentration of the nanoparticles can be graded to increase or decrease across all or a predetermined area of the surface.

In certain embodiments including a plurality of features, each feature can have size dimensions (e.g., length, width, and thickness) that are the same or similar to that of the other features. In certain embodiments, the size of all of the features need not be the same or similar.

In certain embodiments, a feature can have a thickness from about 0.1 to about 200 microns.

In certain embodiments, the features can be spatially dithered.

Dithering or spatial dithering is a term used, for example, in digital imaging to describe the use of small areas of a predetermined palette of colors to give the illusion of color depth. For example, white is often created from a mixture of small red, green and blue areas. In certain embodiments, using dithering of compositions including different types of quantum confined semiconductor nanoparticles (wherein each type is capable of emitting light of a different color) disposed on and/or embedded in a surface of a light guide plate can create the illusion of a different color. In certain embodiments, a light guide plate that appears to emit white light can be created from a dithered pattern of features including, for example, red, green and blue-emitting quantum confined semiconductor nanoparticles. Dithered color patterns are well known.

In certain embodiments, a predetermined color light can be obtained by layering optical materials, each of which can include one or more different types of quantum confined semiconductor nanoparticles (based on composition and size) wherein each type is selected to obtain light having a predetermined color.

In certain embodiments, white light or light of another predetermined spectral output can be obtained by including one or more different types of quantum confined semiconductor nanoparticles (based on composition and size) in a host material, wherein each type is selected to obtain light having a predetermined color.

In certain embodiments, an optical material comprising a host material and quantum confined semiconductor nanocrystals is preferably hardened after it is applied to, or embedded in, the surface to which it is to be applied or embedded. For example, in certain embodiments, the composition may be applied in a molten state which can harden upon cooling; it may be uv-, thermal-, chemically- or otherwise curable and cured after being applied to, or embedded in, a surface of a light guide plate, etc. Alternatively, the optical material may be hardened as a separate film, and then laminated to the surface of the light guide plate by methods known in the art.

While a filter layer is not required to provide a predetermined spectral component as a component of the light output generated with use of an optical material or by a lighting system in accordance with the invention, and may be undesirable for energy considerations, there may be instances in which a filter is included for other reasons. In such instances, a filter may be included. In certain embodiments, a filter may cover all or at least a predetermined portion of the light guide plate. In certain embodiments, a filter can be included for blocking the passage of one or more predetermined wavelengths of light. A filter layer can be included over or under the optical material. In certain embodiments, multiple filter layers can be included, for example, on various surfaces of the light guide plate. In certain embodiments, a filter may be transmissive to certain wavelengths and reflective to others.

In certain embodiments, light guide plate can optionally further include one or more outcoupling members or structures that permit at least a portion of light emitted from a light source to be optically coupled from the light source into the light guide plate. Such members or structures include, for example, and without limitation, members or structures that are attached to a surface of the light guide plate, protrude from a surface of the light guide plate (e.g., prisms), are at least partially embedded in the light guide plate, or are positioned at least partially within a cavity in the light guide plate. In certain embodiments, for example, outcoupling members or structures may be uniformly distributed across a surface of the light guide plate or over a surface thereof as a separate layer or component In certain embodiments, outcoupling members or structures may vary in shape, size, and/or frequency in order to achieve a more uniform light distribution outcoupled from the surface. In certain embodiments, outcoupling members or structures may be positive, i.e., sitting above the surface of the light guide plate, or negative, i.e., depressed into the surface of the light guide plate, or a combination of both. In certain embodiments, one or more features comprising quantum confined semiconductor nanoparticles and a host material can be applied to a surface of a positive outcoupling member or structure, within a negative outcoupling member or structure. In certain embodiments, the optical material may be applied to the surface of the light guide plate opposite of the outcoupling members or structures. In certain embodiments, an outcoupling member or structure can comprise quantum confined semiconductor nanoparticles and a host material.

In certain embodiments, outcoupling members or structures can be formed by molding, embossing, lamination, applying a curable formulation (formed, for example, by techniques including, but not limited to, spraying, lithography, printing (screen, inkjet, flexography, etc), etc.)

In certain embodiments, quantum confined semiconductor nanoparticles are included in the light guide plate in an amount in the range from about 0.001 to about 5 weight percent based on the weight of the light guide plate. In certain preferred embodiments, the light guide plate includes from about 0.01 to about 3 weight percent quantum confined semiconductor nanoparticles based on the weight of the light guide plate. In certain more preferred embodiments, the light guide plate includes from about 0.01 to about 2 weight percent quantum confined semiconductor nanoparticles based on the weight of the light guide plate. In certain most preferred embodiments, the light guide plate includes from about 0.1 to about 1 weight percent quantum confined semiconductor nanoparticles based on the weight of the light guide plate. In certain embodiments, quantum confined semiconductor nanoparticles can be distributed within the light guide plate. In certain embodiments, quantum confined semiconductor nanocrystals can be distributed in a predetermined region of the light guide plate. In certain embodiments, the distribution of quantum confined semiconductor nanoparticles can be substantially uniform throughout the predetermined region of the light guide plate. In certain embodiments, the concentration of quantum confined semiconductor nanoparticles throughout the predetermined region of the light guide plate can be non-uniform (e.g., graded). In certain embodiments, quantum confined semiconductor nanocrystals can be distributed throughout the entire light guide plate. In certain embodiments, the distribution of quantum confined semiconductor nanoparticles can be substantially uniform throughout the entire light guide plate. In certain embodiments, the concentration of quantum confined semiconductor nanoparticles throughout the light guide plate can be non-uniform (e.g., graded). In certain embodiments, scatterers are also distributed within the light guide plate. In certain embodiments, scatterers are included in an amount in the range from about 0.001 to about 5 weight percent of the weight of the light guide plate. In certain embodiments, additional additives can be included within the light guide plate (e.g., without limitation additional surfactants, defoaming agents).

In certain embodiments, the quantum confined semiconductor nanoparticles are included in a layer disposed over a surface of the light guide plate. In certain embodiments, the quantum confined semiconductor nanoparticles are included in a layer sandwiched between light guide plates.

In certain embodiments, the layer has a thickness from about 0.1 to about 200 microns.

In certain embodiments, the layer further comprises a host material in which the quantum confined semiconductor nanoparticles are distributed.

In certain embodiments, quantum confined semiconductor nanoparticles are included in the layer in an amount in the range from about 0.001 to about 5 weight percent of the weight of the host material. In certain preferred embodiments, the layer includes from about 0.01 to about 3 weight percent quantum confined semiconductor nanoparticles based on the weight of the host material. In certain more preferred embodiments, the layer includes from about 0.01 to about 2 weight percent quantum confined semiconductor nanoparticles based on the weight of the host material. In certain most preferred embodiments, the layer includes from about 0.1 to about 1 weight percent quantum confined semiconductor nanoparticles based on the weight of the host material.

In certain embodiments, the host material can comprise a polymer, monomer, resin, binder, glass, metal oxide or other nonpolymeric material. Other examples of host materials are described herein.

In certain embodiments, the quantum confined semiconductor nanoparticles are uniformly dispersed in the layer. In certain embodiments, the quantum confined semiconductor nanoparticles are non-uniformly dispersed in the layer. In certain embodiments, scatterers may also be included in the layer. In certain embodiments, scatterers are included in the layer in an amount in the range from about 0.001 to about 5 weight percent of the weight of the host material.

Optionally other additives (including, but not limited to, UV absorbers, etc.) can be included in the layer.

In certain embodiments, a plurality of layers comprising quantum confined semiconductor nanoparticles can be disposed over a surface of the light guide plate. In certain embodiments, additional additives can be included within the light guide plate (e.g., without limitation additional surfactants, defoaming agents, scatterers).

In certain embodiments, the light guide plate includes a layer comprising an optical material comprising quantum confined semiconductor nanoparticles disposed as a patterned layer over a predetermined area of a surface of the light guide plate. In certain preferred embodiments, the layer comprising an optical material comprising quantum confined semiconductor nanoparticles are arranged in predetermined pattern wherein the quantum confined semiconductor nanoparticles are selected and tuned to emit photons of predetermined wavelength in response to absorption of light.

In certain embodiments, the light guide plates includes a layer comprising quantum confined semiconductor nanoparticles disposed as an unpatterned layer over a predetermined area of a surface of the light guide plate.

In certain embodiments, lighting system can further include a coupling means for coupling light from a light source to a surface of the light guide plate. Examples of light sources include, but are not limited to, those listed below. In certain embodiments, more than one coupling means can be included for coupling more than one light source to the light guide plate.

In certain embodiments, optical material can be included as a layer on a surface of the coupling means through which light from the light source passes before passing into the light guide plate In certain embodiments, optical material can be distributed within the material from which the coupling means is constructed.

Examples of light sources include, without limitation, LEDs (including, but not limited to, inorganic LEDs, etc.), which are well known in the art and are available from numerous sources.)

In certain embodiments, a system can include a single light source.

In certain embodiments, a system can include a plurality of light sources.

In certain embodiments including a plurality of light sources, the individual light sources can be the same or different.

In certain embodiments including a plurality of light sources, each individual light sources can emit light having a wavelength that is the same as or different from that emitted by each of the other light sources.

In certain embodiments including a plurality of light sources, the individual light sources can be arranged as an array.

In certain embodiments including a plurality of light sources, the individual light sources can optically coupled to introduce light into the same or different areas of the light guide plate.

In certain embodiments, a light source comprises a blue LEDs (e.g., (In)GaN blue).

In certain embodiments, a light source or light source array is optically coupled to an edge of the light guide plate.

In certain embodiments, the weight ratio of quantum confined semiconductor nanoparticles to scatterers is from about 1:100 to about 100:1.

In certain embodiments, and optical material further includes a host material. Examples of a host material useful in various embodiments and aspect of the inventions described herein include polymers, monomers, resins, binders, glasses, metal oxides, and other nonpolymeric materials. In certain embodiments, the host material is non-photoconductive. In certain embodiments, an additive capable of dissipating charge is further included in the host material. In certain embodiments, the charge dissipating additive is included in an amount effective to dissipate any trapped charge. In certain embodiments, the host material is non-photoconductive and further includes an additive capable of dissipating charge, wherein the additive is included in an amount effective to dissipate any trapped charge. Preferred host materials include polymeric and non-polymeric materials that are at least partially transparent, and preferably fully transparent, to preselected wavelengths of visible and non-visible light. In certain embodiments, the preselected wavelengths can include wavelengths of light in the visible (e.g., 400-700 nm), ultraviolet (e.g., 10-400 nm), and/or infrared (e.g., 700 nm-1 mm) regions of the electromagnetic spectrum. Preferred host materials include cross-linked polymers. Examples of preferred host materials include, but are not limited to, glass or a transparent resin. In particular, a resin such as a non-curable resin, heat-curable resin, or photocurable resin is suitably used from the viewpoint of processability. As specific examples of such a resin, in the form of either an oligomer or a polymer, a melamine resin, a phenol resin, an alkyl resin, an epoxy resin, a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers forming these resins, and the like.

In certain embodiments and aspects of the inventions described herein, a photocurable resin may be used in order to pattern the composition. As a photo-curable resin, a photo-polymerizable resin such as an acrylic acid or methacrylic acid based resin containing a reactive vinyl group, a photo-crosslinkable resin which generally contains a photosensitizer, such as polyvinyl cinnamate, or the like may be used. A heat-curable resin may be used when the photosensitizer is not used. These resins may be used individually or in combination of two or more.

Examples of scatterers (also referred to herein as light scattering particles) that can be used in the embodiments and aspects of the inventions described herein, include, without limitation, metal or metal oxide particles, air bubbles, and glass and polymeric beads (solid or hollow). Other scatterers can be readily identified by those of ordinary skill in the art. In certain embodiments, scatterers have a spherical shape. Preferred examples of scattering particles include, but are not limited to, TiO2, SiO2, BaTiO3, BaSO4, and ZnO. Particles of other materials that are non-reactive with the host material and that can increase the absorption pathlength of the excitation light in the host material can be used. In certain embodiments, the scatterers may have a high index of refraction (e.g., TiO2, BaS04, etc) or a low index of refraction (gas bubbles).

Selection of the size and size distribution of the scatterers is readily determinable by those of ordinary skill in the art. The size and size distribution is preferably based upon the refractive index mismatch of the scattering particle and the host material in which it the scatterer is to be dispersed, and the preselected wavelength(s) to be scattered according to Rayleigh scattering theory. The surface of the scattering particle may further be treated to improve dispersability and stability in the host material. In one embodiment, the scattering particle comprises TiO2 (R902+ from DuPont) of 0.2. mu.m particle size, in a concentration in a range from about 0.001 to about 5% by weight. In certain preferred embodiments, the concentration range of the scatterers is between 0.1% and 2% by weight.

In certain embodiments of the inventions described herein, quantum confined semiconductor nanoparticles (e.g., semiconductor nanocrystals) are distributed within the host material as individual particles.

In certain embodiments of the inventions described herein, quantum confined semiconductor nanoparticles distributed within the host material may include flocculated (or aggregated) particles.

In certain embodiments of the inventions described herein, quantum confined semiconductor nanoparticles may be included within or adsorbed onto polymer particles.

In certain embodiments, a display includes a lighting system in accordance with the invention. In certain embodiments, the light guide plate is back-illuminated (back-lit), front illuminated (front-lit), edge-illuminated (edge-lit), or with other configurations wherein light from a light source is directed through the light guide plate for creating display images or indicia. In certain embodiments, the display is a liquid crystal display.

In certain embodiments, the light guide plate can be a top or bottom surface, or other component of a light system, a display, another type of lighting device or unit, a waveguide, and the like.

In certain embodiments, light guide plate may optionally include one or more additional layers and/or elements. In one embodiment, for example, light guide plate may further include one or more separate layers including scatterers. A layer including scatterers may be disposed over and/or under any layer or other arrangement of semiconductor nanocrystals included in the light guide plate (whether or not the layer or other arrangement of semiconductor nanocrystals further includes scatters and/or other additives or materials). In certain embodiments of light guide plate including two or more stacked layers or other arrangements including semiconductor nanocrystals, one or more layers comprising scatterers may be disposed between any or all of the layers including semiconductor nanocrystals. Examples of scatters are provided elsewhere herein. In certain embodiments, layers including scatterers can be patterned or unpatterned.

In various embodiments and aspects of the systems and devices of the invention, quantum confined semiconductor nanoparticles comprise semiconductor nanocrystals.

Examples of optical coupling methods include, but are not limited to, methods of coupling wherein the two regions coupled together have similar refractive indices or using an optical adhesive with a refractive index substantially near or in-between the regions or layers. Optical coupling can also be accomplished by an air gap between the light source and light guide plate. Other non-limiting examples of optical coupling include lamination using an index-matched optical adhesive, coating a region or layer onto another region or layer, or hot lamination using applied pressure to join two or more layers or regions that have substantially close refractive indices. Thermal transferring is another method that can be used to optically couple two regions of material.

Figure 2:
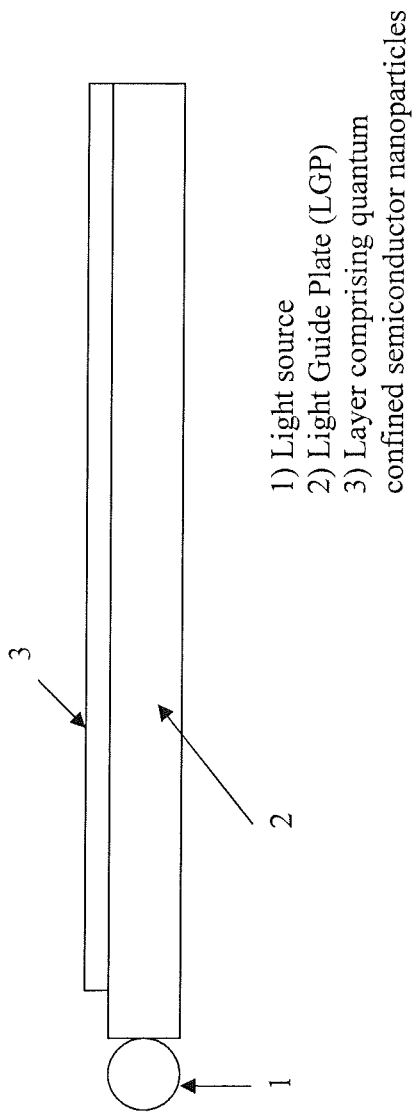
FIG. 2 is a schematic drawing depicting an example of an embodiment of a lighting system in accordance with the invention.
Figure 3:
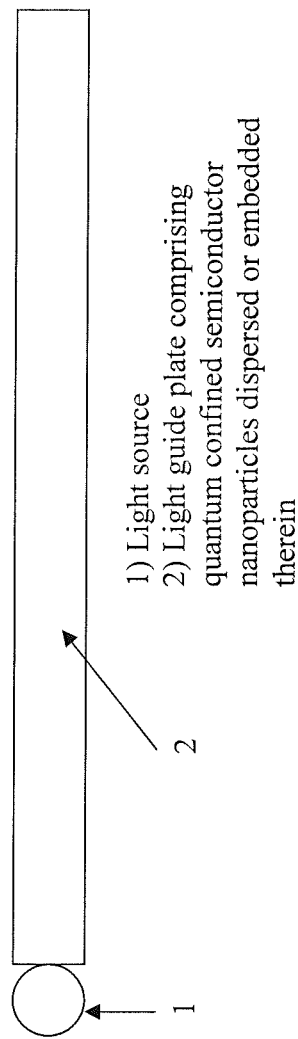
FIG. 3 is a schematic drawing depicting an example of an embodiment of lighting system in accordance with the invention.
Figure 4:
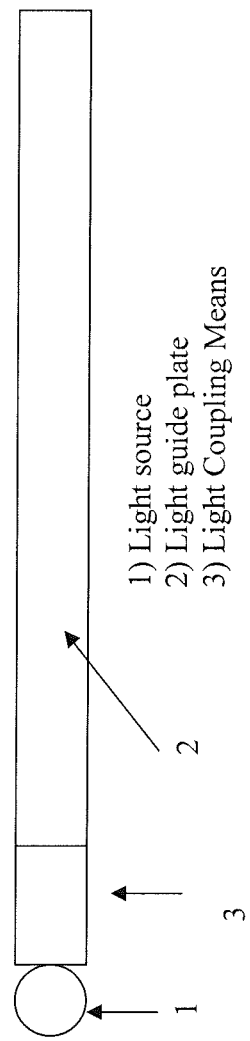
FIG. 4 is a schematic drawing depicting an example of an embodiment of lighting system in accordance with the invention.

FIG. 2, FIG. 3, and FIG. 4 provide schematic drawings of examples of certain embodiments of a lighting system in accordance with the present invention including light guide plate, an optical material, and a light source.

In the example shown in FIG. 2, the lighting system includes a light guide plate 2 and a layer 3 comprising an optical material including semiconductor nanocrystals disposed on a major surface of the light guide plate. In certain embodiments, the layer comprising quantum confined semiconductor nanoparticles (preferably, semiconductor nanocrystals) can optionally further include a host material in which the quantum confined semiconductor nanoparticles are dispersed. Such dispersion can be uniform or non-uniform. In the depicted example, the light source 1 is optically coupled by the light guide plate by butting against an edge of the light guide plate. In the example shown in FIG. 3, the light guide plate 2 includes quantum confined semiconductor nanoparticles dispersed or embedded therein. FIG. 4 schematically depicts an example of another embodiment that further includes a coupling means interposed between the light source and the light guide plate. (The optical material is not shown in FIG. 4.) In such configuration, the optical material can be disposed between the light source and light guide plate. For example, the optical material can be disposed as a layer over at least a portion of one of the surfaces of the coupling means that is parallel to the edge of the light guide plate, the optical material can be disposed as a layer over at least a portion of the edge surface of the light guide plate adjacent the coupling means, or the optical material can be incorporated into the material from which the coupling means is constructed.

A lighting system in accordance with certain embodiments of the present invention can be useful as a backlight unit (BLU) for a liquid crystal device (LCD), including but not limited to LCD BLU s for various mobile applications, including but not limited to, cell phones, computers, GPS navigational devices, portable video devices, and other portable devices including displays.

In certain embodiments, for example, the light source comprises phosphor converted LED (e.g., a white or off-white emitting LED (e.g., a blue emitting LED that is encapsulated with an encapsulant including phosphor material (e.g., a yellow phosphor material, a green phosphor material, and/or a mixture including a yellow and/or green phosphor material) for converting the blue LED light to the desired output), and the optical material comprises one or more types of quantum confined semiconductor nanoparticle.

Other information that may be useful with certain embodiments of the present invention relating to off-white LEDs is described U.S. Patent Application No. 61/234,179, filed 14 Aug. 2009, which is hereby incorporated herein by reference in its entirely.

Because semiconductor nanocrystals have narrow emission linewidths, are photoluminescent efficient, and emission wavelength tunable with the size and/or composition of the nanocrystals, they are preferred quantum confined semiconductor nanocrystals for use in the various aspects and embodiments of the inventions described herein.

The size and composition of quantum confined semiconductor nanoparticles (including, e.g., semiconductor nanocrystals) useful in the various aspects and embodiments of the inventions can be selected such that semiconductor nanocrystals emit photons at a predetermined wavelength of wavelength band in the far-visible, visible, infra-red or other desired portion of the spectrum. For example, the wavelength can be between 300 and 2,500 nm or greater, such as between 300 and 400 nm, between 400 and 700 nm, between 700 and 1100 nm, between 1100 and 2500 nm, or greater than 2500 nm.

Quantum confined semiconductor nanoparticles (including, e.g., semiconductor nanocrystals) are nanometer-scale inorganic semiconductor nanoparticles. Semiconductor nanocrystals include, for example, inorganic crystallites between about 1 nm and about 1000 nm in diameter, preferably between about 2 nm and about 50 urn, more preferably about 1 nm to about 20 nm (such as about 6, 7, 8, 9, 10, 11, 12, 13, 14, 15, 16, 17, 18, 19, or 20 nm).

Semiconductor nanocrystals included in various aspect and embodiments of the inventions most preferably have an average nanocrystal diameter less than about 150 Angstroms (Al In certain embodiments, semiconductor nanocrystals having an average nanocrystal diameter in a range from about 12 to about 150 Å can be particularly desirable.

However, depending upon the composition and desired emission wavelength of the semiconductor nanocrystal, the average diameter may be outside of these various preferred size ranges.

The semiconductor forming the nanoparticles and nanocrystals for use in the various aspects and embodiments of the inventions described herein can comprise Group IV elements, Group II-VI compounds, Group II-V compounds, Group III-VI compounds, Group III-V compounds, Group IV-VI compounds, Group I—III-VI compounds, Group II-IV-VI compounds, or Group II—IV-V compounds, alloys thereof, and/or mixtures thereof, including ternary and quaternary mixtures and/or alloys.

Examples of the shape of the nanoparticles and nanocrystals include sphere, rod, disk, other shape or mixtures thereof.

In certain preferred aspects and embodiments of the inventions, quantum confined semiconductor nanoparticles (including, e.g., semiconductor nanocrystals) include a "core" of one or more first semiconductor materials, which may include an overcoating or "shell" of a second semiconductor material on at least a portion of a surface of the core. In certain embodiments, the shell surrounds the core. A quantum confined semiconductor nanoparticle (including, e.g., semiconductor nanocrystal) core including a shell on at least a portion of a surface of the core is also referred to as a "core/shell" semiconductor nanocrystal.

For example, a quantum confined semiconductor nanoparticle (including, e.g., semiconductor nanocrystal) can include a core comprising a Group IV element or a compound represented by the formula MX, where M is, for example, but not limited to, cadmium, zinc, magnesium, mercury, aluminum, gallium, indium, thallium, or mixtures thereof, and X is, for example, but not limited to, oxygen, sulfur, selenium, tellurium, nitrogen, phosphorus, arsenic, antimony, or mixtures thereof. A nanoparticle can also comprise alloys thereof, and/or mixtures, including ternary and quaternary mixtures and/or alloys.

In certain embodiments, the surrounding "shell" material can have a bandgap greater than the bandgap of the core material and can be chosen so as to have an atomic spacing close to that of the "core" substrate. In another embodiment, the surrounding shell material can have a bandgap less than the bandgap of the core material. In a further embodiment, the shell and core materials can have the same crystal structure. Shell materials are discussed further below Quantum confined semiconductor nanoparticles are preferably members of a population of semiconductor nanoparticles having a narrow size distribution. More preferably, the quantum confined semiconductor nanoparticles (including, e.g., semiconductor nanocrystals) comprise a monodisperse or substantially monodisperse population of nanoparticles.

In certain embodiments, the % absorption of quantum confined semiconductor nanoparticles included in the various aspects and embodiments of the invention is, for example, from about 0.1% to about 99%; and preferably of at least about 10% to about 99%. In one preferred example, the % absorption is from about 10% to about 90% absorption. In another preferred example, the % absorption is from about 10% to about 50%; in another example, the % absorption if from about 50% to about 90%.

For example, preparation and manipulation of semiconductor nanocrystals are described in Murray et al. (J. Am. Chem. Soc., 115:8706 (1993)); in the thesis of Christopher Murray, "Synthesis and Characterization of II-VI Quantum Dots and Their Assembly into 3-D Quantum Dot Superlattices", Massachusetts Institute of Technology, September, 1995; and in U.S. patent application Ser. No. 08/969,302 entitled "Highly Luminescent Color-selective Materials" which are hereby incorporated herein by reference in their entireties. Other examples of the preparation and manipulation of semiconductor nanocrystals are described in U.S. Pat. Nos. 6,322,901 and 6,576,291, and U.S. Patent Application No. 60/550,314, each of which is hereby incorporated herein by reference in its entirety.

Other materials, techniques, methods, applications, and information that may be useful with the present invention are described in: U.S. Application No. 61/162,293, filed 21 Mar. 2009, U.S. Application No. 61/173,375 filed 28 Apr. 2009, U.S. Application No. 61/175,430 filed 4 May 2009, U.S. Patent Application No. 61/175,456, filed 4 May 2009, U.S. Patent Application No. 61/234,179, filed 14 Aug. 2009, International Patent Application No. PCT/US2009/002789, filed 6 May 2009; U.S. patent application Ser. No. 12/283,609 of Seth Coe-Sullivan et al. for "Compositions, Optical Component, System Including An Optical Components, Devices, And Other Products", filed 12 Sep. 2008, Murray, et al., J. Am. Chem. Soc., Vol. 115, 8706 (1993); Kortan, et al., J. Am. Chem. Soc., Vol. 112, 1327 (1990), International Application No. PCT/US2008/10651, of Breen, et al., for "Functionalized Nanoparticles And Method", filed 12 Sep. 2008, International Application No. PCT/US2007/024320 of Clough, et al., for "Nanocrystals Including A Group Ilia Element And A Group Va Element, Method, Composition, Device and Other Products", filed 21 Nov. 2007; International Application No. PCT/US2009/002796 of Seth Coe-Sullivan et al. for "Optical Components, Systems Including an Optical Component, And Devices", filed 6 May 2009, and U.S. Patent Application No. 61/252,656 of Breen for "Method For Preparing Quantum Dots", filed 17 Oct. 2009. Each of the foregoing is hereby incorporated by reference herein in its entirety.

In various aspects and embodiments of the invention, quantum confined semiconductor nanoparticles (including, but not limited to, semiconductor nanocrystals) optionally have ligands attached thereto.

In certain embodiments, the ligands are derived from the coordinating solvent used during the growth process. The surface can be modified by repeated exposure to an excess of a competing coordinating group to form an overlayer. For example, a dispersion of the capped semiconductor nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the semiconductor nanocrystal, including, for example, phosphines, thiols, amines and phosphates. The semiconductor nanocrystal can be exposed to short chain polymers which exhibit an affinity for the surface and which terminate in a moiety having an affinity for a suspension or dispersion medium. Such affinity improves the stability of the suspension and discourages flocculation of the semiconductor nanocrystal. In other embodiments, semiconductor nanocrystals can alternatively be prepared with use of non-coordinating solvent(s).

A suitable coordinating ligand can be purchased commercially or prepared by ordinary synthetic organic techniques, for example, as described in J. March, Advanced Organic Chemistry, which is incorporated herein by reference in its entirety.

See also U.S. patent application Ser. No. 10/641,292 entitled "Stabilized Semiconductor Nanocrystals", filed 15 Aug. 2003, which is hereby incorporated herein by reference in its entirety.

The emission from a quantum confined semiconductor nanoparticle can be a narrow Gaussian emission band that can be tuned through the complete wavelength range of the ultraviolet, visible, or infra-red regions of the spectrum by varying the size of the quantum confined semiconductor nanoparticle, the composition of the quantum confined semiconductor nanoparticle, or both. For example, CdSe can be tuned in the visible region and InAs can be tuned in the infra-red region. The narrow size distribution of a population of quantum confined semiconductor nanoparticles can result in emission of light in a narrow spectral range. The population can be monodisperse preferably exhibits less than a 15% rms (root-mean-square) deviation in diameter of the quantum confined semiconductor nanoparticle s, more preferably less than 10%, most preferably less than 5%. Spectral emissions in a narrow range of no greater than about 75 nm, preferably 60 nm, more preferably 40 nm, and most preferably 30 nm full width at half max (FWHM) for quantum confined semiconductor nanoparticle s that emit in the visible can be observed. IR-emitting quantum confined semiconductor nanoparticle scan have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of quantum confined semiconductor nanoparticle diameters decreases.

For example, semiconductor nanocrystals can have high emission quantum efficiencies such as greater than 10%, 20%, 30%, 40%, 50%, 60%, 70%, or 80%.

The narrow FWHM of semiconductor nanocrystals can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of semiconductor nanocrystals will emit light spanning a narrow range of wavelengths. A pattern including more than one size of semiconductor nanocrystal can emit light in more than one narrow range of wavelengths. The color of emitted light perceived by a viewer can be controlled by selecting appropriate combinations of semiconductor nanocrystal sizes and materials. The degeneracy of the band edge energy levels of semiconductor nanocrystals facilitates capture and radiative recombination of all possible excitons.

Transmission electron microscopy (TEM) can provide information about the size, shape, and distribution of the semiconductor nanocrystal population. Powder X-ray diffraction (XRD) patterns can provide the most complete information regarding the type and quality of the crystal structure of the semiconductor nanocrystals. Estimates of size are also possible since particle diameter is inversely related, via the X-ray coherence length, to the peak width. For example, the diameter of the semiconductor nanocrystal can be measured directly by transmission electron microscopy or estimated from X-ray diffraction data using, for example, the Scherrer equation. It also can be estimated from the UV/Vis absorption spectrum.

Quantum confined semiconductor nanoparticles are preferably handled in a controlled (oxygen-free and moisture-free) environment, preventing the quenching of luminescent efficiency during the fabrication process.

An optical material including one or more types of quantum confined semiconductor nanoparticles can be dispersed in a liquid medium and are therefore compatible with solution based processing techniques, phase-separation, spin casting, ink-jet printing, silk-screening, drop-casting, dip coating and other liquid film techniques available for forming thin films or patterns on a surface In certain preferred embodiments, an optical material for use in various aspects and embodiments in accordance with the invention can be prepared, for example, from an ink comprising quantum confined semiconductor nanoparticles and a liquid vehicle, wherein the liquid vehicle comprises one or more functional groups that are capable of being polymerized (e.g., cross-linked) to form a host material. In certain embodiments, the functional units can be cross-linked by UV treatment. In certain embodiments, the functional units can be cross-linked by thermal treatment. In certain embodiments, the functional units can be cross-linked by other cross-linking technique readily ascertainable by a person of ordinary skill in a relevant art. In certain embodiments, the optical material including one or more functional groups that are capable of being cross-linked can be the liquid vehicle itself. See also International Application No. PCT/US2008/007901 of Linton, et al., for "Compositions And Methods Including Depositing Nanomaterial", filed 25 Jun. 2008, the disclosure of which is hereby incorporated herein by reference in its entirety. Optionally, the ink further includes scatterers and/or other additives.

An ink can be deposited onto a surface of a substrate by printing, screen-printing, spin-coating, gravure techniques, inkjet printing, roll printing, etc. The ink can be deposited in a predetermined arrangement. For example, the ink can be deposited in a patterned or unpatterned arrangement.

In certain embodiments, quantum confined semiconductor nanoparticles can be deposited on a surface using contact printing. See, for example, A. Kumar and G. Whitesides, *Applied Physics Letters,* 63, 2002-2004, (1993); and V. Santhanam and R. P. Andres, *Nano Letters,* 4, 41-44, (2004), each of which is incorporated by reference in its entirety. See also U.S. patent application Ser. No. 11/253,612, filed 21 Oct. 2005, entitled "Method And System For Transferring A Patterned Material", of Coe-Sullivan et al. and U.S. patent application Ser. No. 11/253,595, filed 21 Oct. 2005, entitled "Light Emitting Device Including Semiconductor Nanocrystals," of Coe-Sullivan, each of which is incorporated herein by reference in its entirety.

In certain embodiments the thickness of the optical material including one or more types of quantum confined semiconductor nanoparticles and the amount of nanoparticles included therein is selected to achieve the desired % absorption and re-emission thereby. Most preferably, the quantum confined semiconductor nanoparticles do not absorb any, or absorb only negligible amounts of, there-emitted photons.

In certain embodiments, methods for applying a material (e.g., an optical material) to a predefined region on a substrate (e.g., light guide plate) may be desirable. The predefined region is a region on the substrate where the material is selectively applied. The material and substrate can be chosen such that the material remains substantially entirely within the predetermined area. By selecting a predefined region that forms a pattern, material can be applied to the substrate such that the material forms a pattern. The pattern can be a regular pattern (such as an array, or a series of lines), or an irregular pattern. Once a pattern of material is formed on the substrate, the substrate can have a region including the material (the predefined region) and a region substantially free of material. In some circumstances, the material forms a monolayer on the substrate. The predefined region can be a discontinuous region. In other words, when the material is applied to the predefined region of the substrate, locations including the material can be separated by other locations that are substantially free of the material.

Alternatively, an optical material comprising one or more types of quantum confined semiconductor nanoparticle can be dispersed in a light-transmissive material (e.g., a polymer, a resin, a silica glass, or a silica gel, etc.), which is preferably at least partially light-transmissive, and more preferably transparent, to the light emitted by the quantum confined semiconductor nanoparticles and in which quantum confined semiconductor nanoparticles can be dispersed) that is deposited as a full or partial layer or in a patterned arrangement by any of the above-listed or other known techniques. Suitable materials include many inexpensive and commonly available materials, such as polystyrene, epoxy, polyimides, and silica glass. After application to the surface, such material may contain a dispersion of quantum confined semiconductor nanoparticles where the nanoparticles have been size selected so as to produce light of a given color. Other configurations of quantum confined semiconductor nanoparticles disposed in a material, such as, for example, a two-dimensional layer on a substrate with a polymer overcoating are also contemplated. In certain embodiments in which quantum confined semiconductor nanoparticles are dispersed in a host material and applied as a layer on a surface of the light guide plate, the refractive index of the layer including the quantum confined semiconductor nanoparticles can have a refractive index that is greater than or equal to the refractive index of the light guide plate.

In certain embodiments in which the quantum confined semiconductor nanoparticles are dispersed in a host material and applied as a layer on a surface of the light guide plate, the refractive index of the layer including the quantum confined semiconductor nanoparticles can have a refractive index that is less than the refractive index of the light guide plate.

In certain embodiments, a reflective material can be applied to a surface of the light guide plate opposite that on which a layer including quantum confined semiconductor nanoparticles is disposed to enhance internal reflections of light within the light guide plate.

In embodiment of the invention including a layer of optical material comprising quantum confined semiconductor nanoparticles, the optical material can optionally further include a cover, coating or layer over at least the portion of the surface upon which the layer of optical material is disposed for protection from the environment (e.g., dust, moisture, and the like) and/or scratching or abrasion.

In certain embodiments, lighting system can further include a lens, prismatic surface, grating, etc. on the surface of the lighting system from which light is emitted. Other coatings can also optionally be included on such surface. In certain embodiments, such surface can be a surface of the light guide plate.

U.S. Patent Application No. 61/016,227 of Seth Coe-Sullivan et al. for "Compositions, Optical Component, System Including An Optical Components, and Devices", filed 21 Dec. 2007 is hereby incorporated herein by reference in its entirety.

As used herein, "top", "bottom", "over", and "under" are relative positional terms, based upon a location from a reference point. More particularly, "top" means farthest away from a reference point, while "bottom" means closest to the reference point. Where, e.g., a first layer is described as disposed or deposited "over" a second layer on a substrate, the first layer is disposed further away from substrate. There may be other layers or elements between the first and second layer, unless it is otherwise specified. As used herein, "cover" is also a relative position term, based upon a location from a reference point. For example, where a first material is described as covering a second material, the first material is disposed over, but not necessarily in contact with the second material.

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A lighting system, which comprises:
 a light source providing a light having a first predetermined spectral output, and
 a layer comprising an optical material optically coupled to receive at least a portion of the light from the light source and to convert at least a portion of the light to at least one predetermined wavelength to provide modified light having a second predetermined spectral output,
 wherein the light source comprises a blue emitting material, wherein the optical material comprises quantum confined semiconductor nanoparticles, and the quantum confined semiconductor nanoparticles are arranged in a predetermined pattern to emit photons of predetermined wavelength in response to absorption of the light, wherein the layer comprising the optical material comprises a first patterned layer, and the layer comprising the optical material comprises a first type of quantum confined semiconductor nanoparticle capable of emitting red light, wherein the optical material is spaced from the light source, and wherein the second predetermined spectral output includes a red component having a CIE x>0.64.

2. A lighting system in accordance with claim 1, wherein the layer comprising the optical material comprises a second patterned layer and the layer comprising the optical material comprises a second type of quantum confined semiconductor nanoparticle capable of emitting green light.

3. A lighting system in accordance with claim 1, wherein the first predetermined spectral output comprises a spectral component in a region from about 360 nm to about 475 nm.

4. A lighting system in accordance with claim 1, wherein the modified light having the second predetermined spectral output is emitted from the lighting system.

5. A lighting system in accordance with claim 1, wherein the second predetermined spectral output comprises red peak emission.

6. A lighting system in accordance with claim 4, wherein the second predetermined spectral output further comprises green peak emission.

7. A lighting system in accordance with claim 1, wherein the quantum confined semiconductor nanoparticles are cadmium free.

8. A lighting system in accordance with claim 1, wherein the quantum confined semiconductor nanoparticle comprises a III-V semiconductor material.

9. A lighting system in accordance with claim 1, wherein the quantum confined semiconductor nanoparticles comprise a core comprising a Group IV element or a compound represented by a formula MX, where M is cadmium, zinc, magnesium, mercury, aluminum, gallium, indium, thallium, or a mixture thereof, and X is oxygen, sulfur, selenium, tellurium, nitrogen, phosphorus, arsenic, antimony, or a mixture thereof, and an inorganic shell disposed on at least a portion of a surface of the core.

10. A lighting system in accordance with claim 1, wherein the layer comprising the optical material further comprises a host material and the quantum confined semiconductor nanoparticles are distributed in the host material.

11. A lighting system in accordance with claim 10, wherein the host material comprises a polymeric material at least partially transparent to preselected wavelengths of visible light.

12. A lighting system in accordance with claim 1 wherein the layer comprising the optical material further comprises scatterers and the scatterers comprises a metal particle, a metal oxide particle, a glass bead, a polymeric bead, or a combination thereof.

13. A lighting system in accordance with claim 12, wherein the metal oxide particle comprises $TiO_2$, $SiO_2$, $BaTiO_2$, $BaSO_4$, or ZnO.

14. A lighting system in accordance with claim 12, wherein the layer comprising the optical material further comprises a host material and the scatteres are included in the layer in an amount from about 0.001 to about 5 weight percent of the weight of the host material.

15. A lighting system in accordance with claim 1, wherein the lighting system comprises a filter layer over the layer comprising the optical material.

16. A lighting system in accordance with claim 1, wherein the filter layer blocks passage of one or more predetermined wavelengths of light.

17. A display comprising a lighting system in accordance with claim 1.

* * * * *